US009689688B2

(12) United States Patent
Sasao et al.

(10) Patent No.: US 9,689,688 B2
(45) Date of Patent: Jun. 27, 2017

(54) IMAGE DISPLAY SYSTEM, IMAGE DISPLAY METHOD AND PROGRAM

(71) Applicant: NS SOLUTIONS CORPORATION, Chuo-ku, Tokyo (JP)

(72) Inventors: Kazuhiro Sasao, Tokyo (JP); Masaru Yokoyama, Tokyo (JP); Arata Sakurai, Tokyo (JP); Ricardo Musashi Okamoto, Tokyo (JP)

(73) Assignee: NS Solutions Corporation, Tokyo (JP)

( * ) Notice: Subject to any disclaimer, the term of this patent is extended or adjusted under 35 U.S.C. 154(b) by 0 days.

(21) Appl. No.: 14/228,159

(22) Filed: Mar. 27, 2014

(65) Prior Publication Data
US 2014/0210853 A1 Jul. 31, 2014
US 2017/0140653 A9 May 18, 2017

Related U.S. Application Data

(62) Division of application No. 13/635,370, filed as application No. PCT/JP2011/057972 on Mar. 30, 2011, now Pat. No. 8,896,685.

(30) Foreign Application Priority Data

Mar. 30, 2010 (JP) .................................. 2010-078973
Mar. 30, 2010 (JP) .................................. 2010-079446
(Continued)

(51) Int. Cl.
*H04N 7/18* (2006.01)
*G01C 21/34* (2006.01)
(Continued)

(52) U.S. Cl.
CPC .............. *G01C 21/34* (2013.01); *B63B 43/18* (2013.01); *B63B 49/00* (2013.01); *G01C 13/008* (2013.01);
(Continued)

(58) Field of Classification Search
CPC ....................................................... G01C 21/34
(Continued)

(56) References Cited

U.S. PATENT DOCUMENTS 4,730,570 A * 3/1988 Harris ......................... 114/61.18
5,748,107 A 5/1998 Kersken et al.
(Continued)

FOREIGN PATENT DOCUMENTS

EP 0 679 984 A1 11/1995
EP 1 365 358 A2 11/2003
(Continued)

OTHER PUBLICATIONS

Extended European Search Report issued Aug. 27, 2013, in counterpart European Patent Application No. 11762878. (9 pp).
(Continued)

*Primary Examiner* — Leron Beck
(74) *Attorney, Agent, or Firm* — Arent Fox LLP

(57) ABSTRACT

A mobile terminal obtains image data related to a product posted on a flier by imaging and sends the image data related to the product to a shopping management server. Upon reception of the image data related to the product from the mobile terminal, the shopping management server determines the product by analyzing the image data related to the product, obtains at least one of inventory information and sales information of the product, and sends at least one of the inventory information and the sales information of the product to the mobile terminal. The mobile terminal combines computer-graphics image data indicating at least one of the inventory information and the sales information of the product sent from the shopping management server with an image of the flier in real space and presents the combined image, thereby solving the problem.

8 Claims, 41 Drawing Sheets

(30) Foreign Application Priority Data

| Mar. 31, 2010 | (JP) | 2010-081894 |
|---|---|---|
| Mar. 14, 2011 | (JP) | 2011-055410 |
| Mar. 16, 2011 | (JP) | 2011-057899 |
| Mar. 18, 2011 | (JP) | 2011-061375 |

(51) Int. Cl.

| G08G 1/14 | (2006.01) |
|---|---|
| G06T 19/00 | (2011.01) |
| G08G 1/04 | (2006.01) |
| G06Q 30/06 | (2012.01) |
| G06Q 30/02 | (2012.01) |
| B63B 49/00 | (2006.01) |
| G09B 29/00 | (2006.01) |
| G06T 11/00 | (2006.01) |
| B63B 43/18 | (2006.01) |
| G06Q 10/08 | (2012.01) |
| G06T 11/60 | (2006.01) |
| G08G 3/00 | (2006.01) |
| G06F 17/30 | (2006.01) |
| G06K 9/62 | (2006.01) |
| G01C 21/36 | (2006.01) |
| G01C 21/00 | (2006.01) |
| G01C 13/00 | (2006.01) |
| G01C 21/20 | (2006.01) |
| B63J 99/00 | (2009.01) |
| G02B 27/01 | (2006.01) |

(52) U.S. Cl.
CPC ........... *G01C 21/00* (2013.01); *G01C 21/20* (2013.01); *G01C 21/3407* (2013.01); *G01C 21/3685* (2013.01); *G06F 17/30247* (2013.01); *G06K 9/6201* (2013.01); *G06Q 10/087* (2013.01); *G06Q 30/0207* (2013.01); *G06Q 30/06* (2013.01); *G06Q 30/0601* (2013.01); *G06Q 30/0639* (2013.01); *G06T 11/00* (2013.01); *G06T 11/60* (2013.01); *G06T 19/003* (2013.01); *G06T 19/006* (2013.01); *G08G 1/04* (2013.01); *G08G 1/143* (2013.01); *G08G 3/00* (2013.01); *G09B 29/007* (2013.01); *B63B 2213/02* (2013.01); *B63J 2099/008* (2013.01); *G02B 27/01* (2013.01)

(58) Field of Classification Search
USPC .......................................................... 348/16
See application file for complete search history.

(56) References Cited

U.S. PATENT DOCUMENTS

| 5,786,849 | A | * | 7/1998 | Lynde ........................... 348/113 |
|---|---|---|---|---|
| 5,862,388 | A | | 1/1999 | Danneels et al. |
| 5,910,782 | A | | 6/1999 | Schmitt et al. |
| 6,259,988 | B1 | | 7/2001 | Galkowski et al. |
| 6,285,297 | B1 | | 9/2001 | Ball |
| 6,426,708 | B1 | | 7/2002 | Trajkovic et al. |
| 6,456,941 | B1 | * | 9/2002 | Gutierrez ....................... 701/301 |
| 6,559,776 | B2 | | 5/2003 | Katz |
| 6,812,962 | B1 | | 11/2004 | Fredlund et al. |
| 6,816,085 | B1 | | 11/2004 | Haynes et al. |
| 6,970,101 | B1 | | 11/2005 | Squire et al. |
| 6,999,875 | B2 | | 2/2006 | Tu |
| 7,386,372 | B2 | | 6/2008 | Breed et al. |
| 7,492,283 | B1 | | 2/2009 | Racunas, Jr. |
| 7,516,011 | B1 | * | 4/2009 | Kabel et al. .................. 701/415 |
| 8,139,115 | B2 | | 3/2012 | Barnes et al. |
| 8,300,889 | B2 | | 10/2012 | Jung |
| 8,306,734 | B2 | | 11/2012 | Mathews |
| 2004/0041794 | A1 | | 3/2004 | Kidode et al. |
| 2004/0046779 | A1 | | 3/2004 | Asano et al. |
| 2005/0071082 | A1 | | 3/2005 | Ohmura et al. |
| 2006/0038833 | A1 | | 2/2006 | Mallinson et al. |
| 2006/0055525 | A1 | | 3/2006 | Kubota et al. |
| 2008/0051996 | A1 | * | 2/2008 | Dunning et al. .............. 701/211 |
| 2009/0102859 | A1 | | 4/2009 | Athsani et al. |
| 2009/0106126 | A1 | | 4/2009 | Asano et al. |
| 2009/0285484 | A1 | | 11/2009 | Mallinson et al. |
| 2010/0053151 | A1 | | 3/2010 | Marti et al. |
| 2010/0103241 | A1 | | 4/2010 | Linaker |
| 2010/0302094 | A1 | * | 12/2010 | Bunch et al. ............... 342/26 D |
| 2011/0153043 | A1 | | 6/2011 | Ojala |

FOREIGN PATENT DOCUMENTS

| EP | 1 965 344 A1 | 9/2008 |
|---|---|---|
| EP | 2043071 A2 | 4/2009 |
| JP | 3-103420 U | 10/1991 |
| JP | 07-225899 A | 8/1995 |
| JP | 10-176928 A | 6/1998 |
| JP | 10-198731 A | 7/1998 |
| JP | 2003-005683 A | 1/2003 |
| JP | 2004-048674 A | 2/2004 |
| JP | 2004-212192 | 7/2004 |
| JP | 2005-127996 A | 5/2005 |
| JP | 2006-209429 A | 8/2006 |
| JP | 2007-078367 A | 3/2007 |
| JP | 2007-248308 A | 9/2007 |
| JP | 2008-510254 A | 4/2008 |
| JP | 2009-116425 A | 5/2009 |
| WO | WO 2008/104537 A1 | 9/2008 |
| WO | WO 2008/114955 A1 | 9/2008 |
| WO | WO 2009/156488 A1 | 12/2009 |

OTHER PUBLICATIONS

Junji Hujuto et al., "Intermediate Report of Study on Collision and Strand Avoiding System as Fail Safe", Feb. 10, 2010.
Yoshiki Hanatani et al., "Simulation for Pedestrian Navigation System by Augmented Reality", Information Processing Societies, Mar. 12, 2002, pp. 4-149-4-150.
Chehimi et al., "Augmented Reality 3D Interactive Advertisements on Smarphones," Conference Proceedings, IEEE Computer Society (Jul. 1, 2007).
European Search Report dated Jul. 14, 2014 issued in European Patent Application No. 14161554.2.
European Search Report dated Jun. 23, 2014 issued in European Patent Application No. 14161557.5.
European Search Report dated Jun. 6, 2014 issued in European Patent Application No. 14161561.7.
Office Action, dated Nov. 6, 2014, issued in corresponding U.S. Appl. No. 14/228,168.
Office Action, dated Nov. 6, 2014, issued in corresponding U.S. Appl. No. 14/228,176.
European Office Action issued May 13, 2015; EP Application No. 14 161 561.7.
EP Office Action dated Jul. 7, 2015; Application No. 14 161 554.2.
Office Action dated Jul. 16, 2015; U.S. Appl. No. 14/228,168.
Office Action dated Jul. 8, 2015; U.S. Appl. No. 14/521,259.
Tönnis, M. et al. "Visual Longitudinal and Lateral Driving Assistance in teh Head-Up Display of Cars". The Sixth IEEE and ACM International Symposium on Mixed and Augmented Reality, Nov. 16, 2007.
Office Action of U.S. Appl. No. 14/521,259 dated Feb. 1, 2016.

* cited by examiner

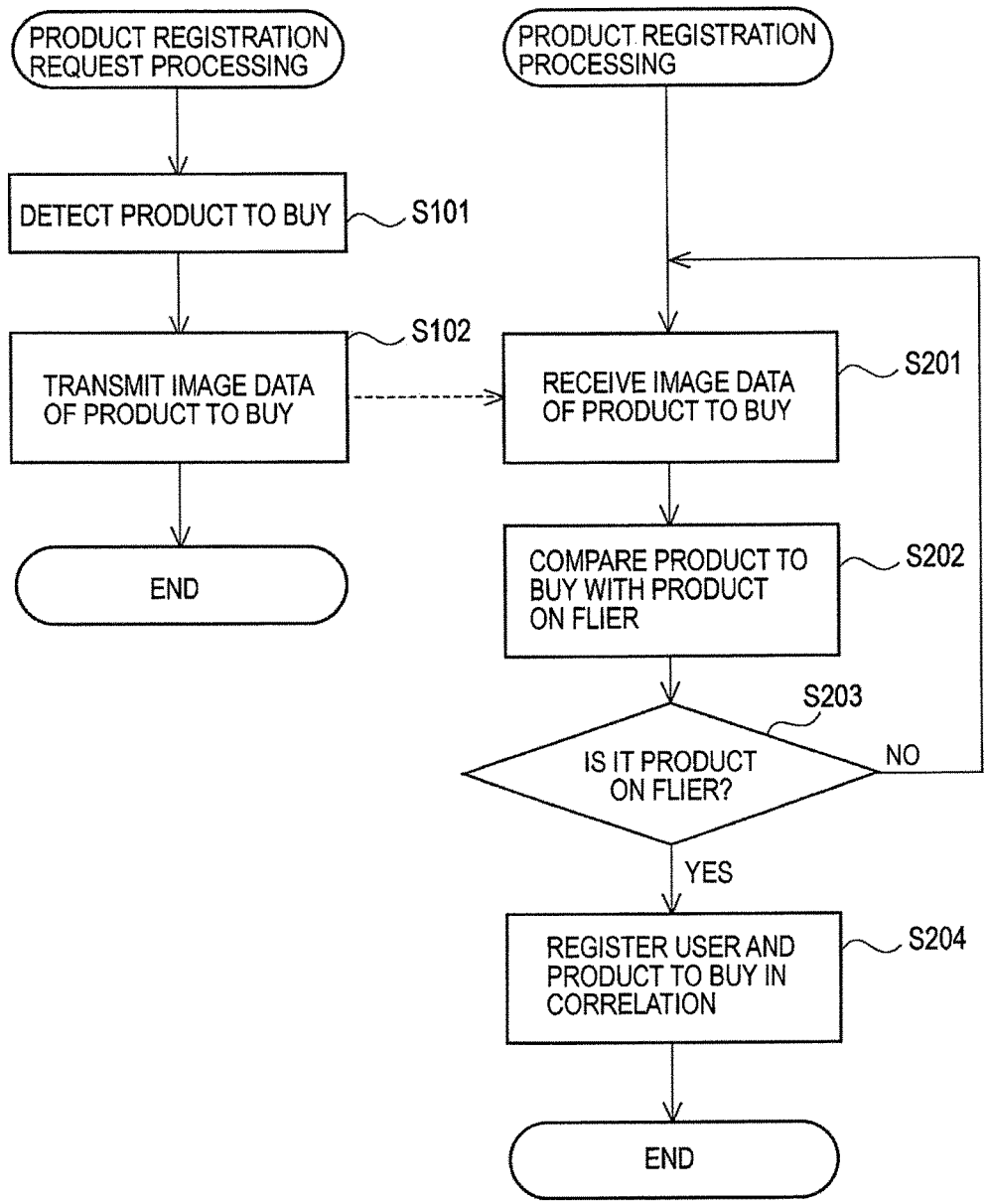

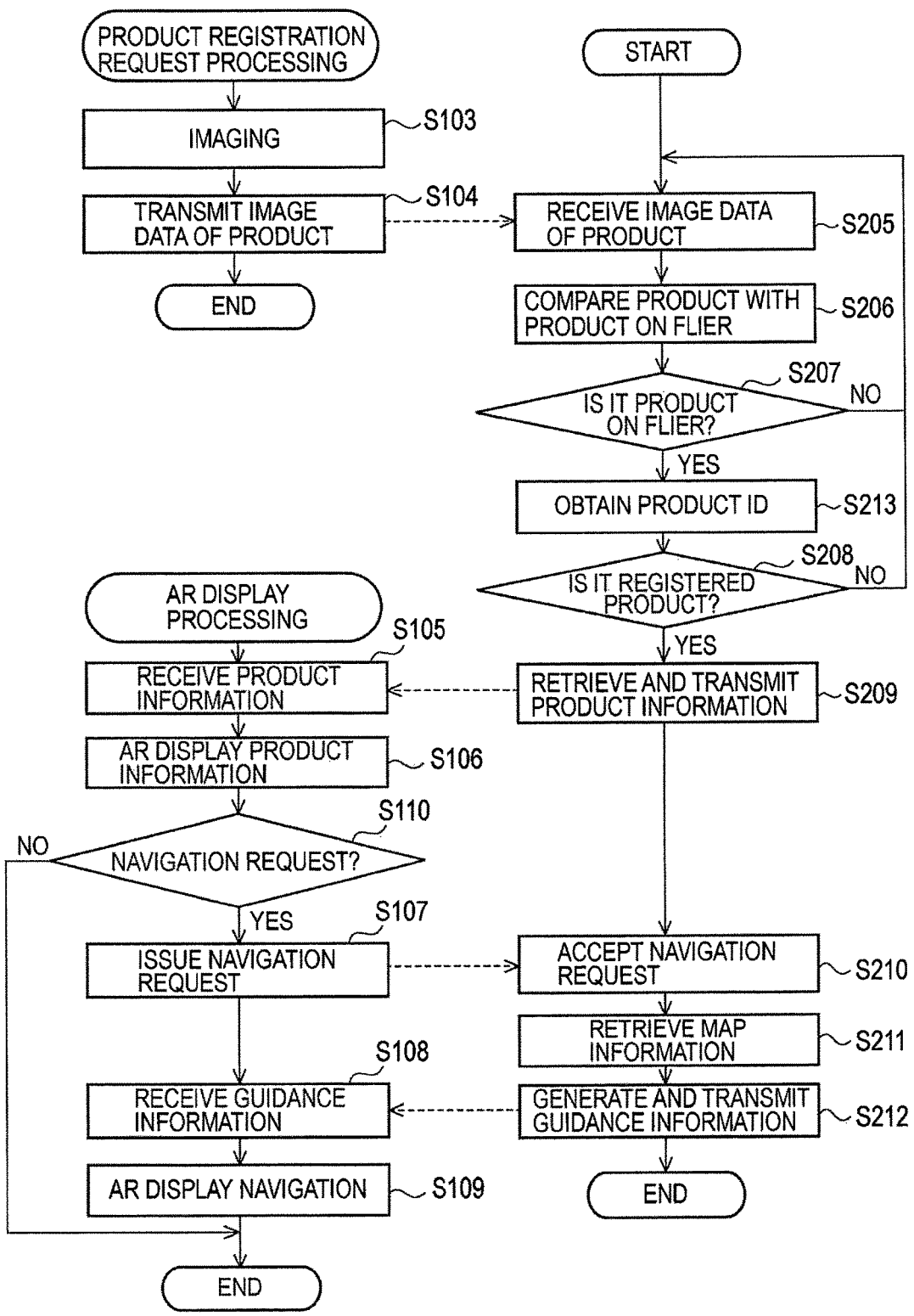

FIG.9

| | PRODUCT ID | PRODUCT NAME | PRICE 1 | PRICE 2 | ... | SHOP | STOCK QUANTITY | PRODUCT ATTRIBUTE | |
|---|---|---|---|---|---|---|---|---|---|
| 901 | 1011 | APPLE | 100 YEN | 80 YEN | ... | SHOP A | 100 | PLACE OF PRODUCTION A | |
| | 2013 | SWEATER | 2000 YEN | 1500 YEN | ... | SHOP A | 50 | COLOR, SIZE | |
| | 2101 | CABBAGE | 200 YEN | 170 YEN | ... | SHOP A | 70 | PLACE OF PRODUCTION B | |
| | 3110 | SHIRT | 3000 YEN | 2600 YEN | ... | SHOP A | 20 | COLOR, SIZE | |
| | 4430 | WATER | 150 YEN | 120 YEN | ... | SHOP A | 70 | PLACE OF PRODUCTION C | |
| | ... | ... | ... | ... | ... | ... | | | |

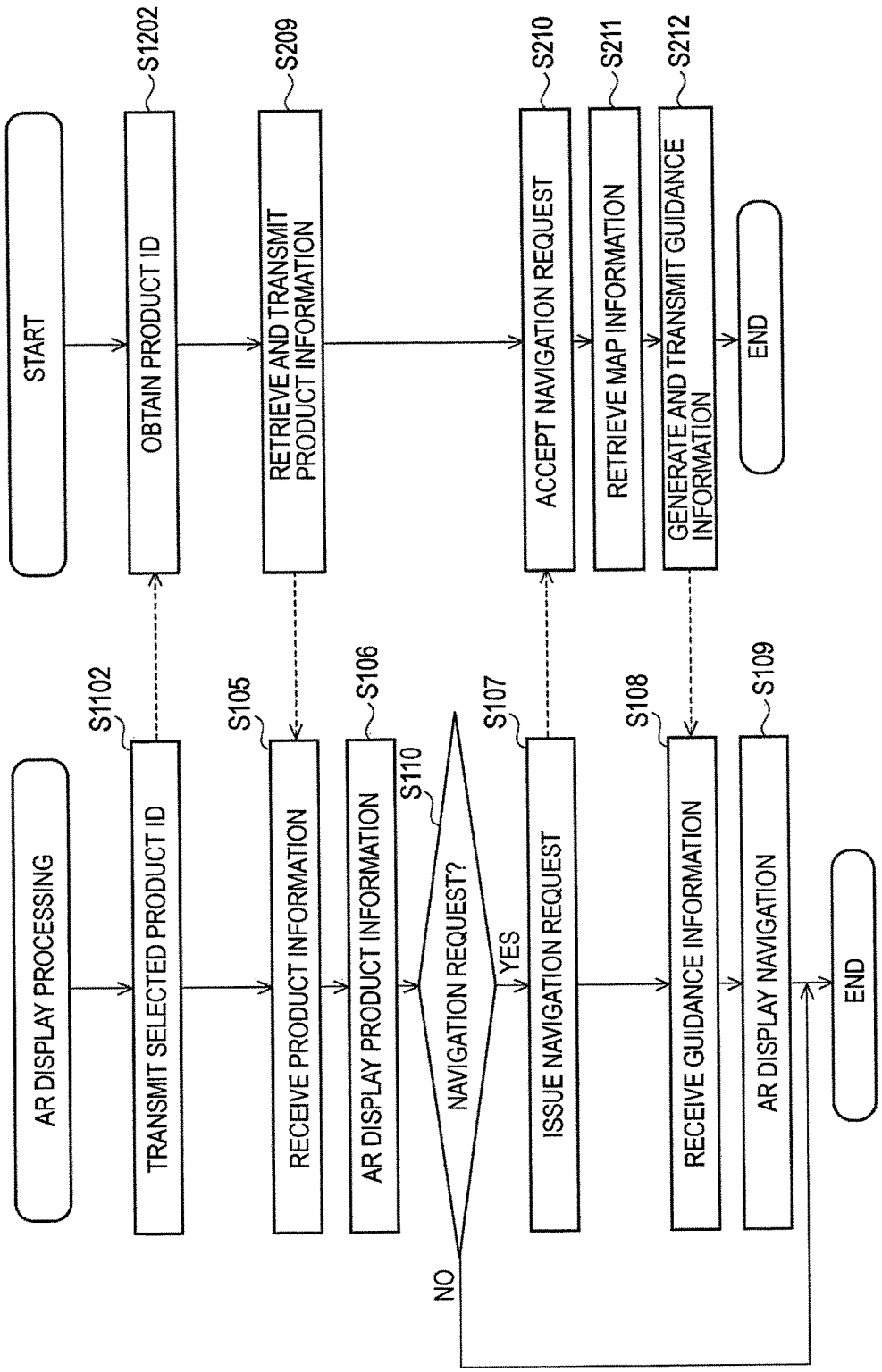

IMAGE DISPLAY SYSTEM, IMAGE DISPLAY METHOD AND PROGRAM

CROSS-REFERENCE TO RELATED APPLICATION

This application is a Divisional of U.S. patent application Ser. No. 13/635,370, filed Sep. 14, 2012, which is a National Stage entry of International Application No. PCT/JP2011/057972 filed Mar. 30, 2011, which claims priority to Japanese Patent Application No. 2010-078973 and Japanese Patent Application No. 2010-079446, filed Mar. 30, 2010, Japanese Patent Application No. 2010-081894, filed Mar. 31, 2010, Japanese Patent Application No. 2011-055410, filed Mar. 14, 2011, Japanese Patent Application No. 2011-057899, filed Mar. 16, 2011, and Japanese Patent Application No. 2011-061375, filed Mar. 18, 2011. The disclosures of the prior applications are hereby incorporated in their entirety by reference.

TECHNICAL FIELD

The present invention relates to an information processing system, an information processing method and a program, an information processing apparatus, a vacant space guidance system, a vacant space guidance method and a program, an image display system, an image display method and a program.

BACKGROUND ART

Navigation technologies are utilized in various fields such as guiding to a destination and presenting an operating procedure during an operation. The navigation technologies are to provide support for facilitating a certain action, and hence systems which allow understanding as intuitive as possible have been demanded hitherto. As one of such systems, there exists a navigation technology utilizing what is called an augmented reality which displays data of texts, images, and so on managed in a computer in a manner overlaid on a real environment, so as to give supplementary information to the real environment.

For example, as a navigation technology for shopping, there has been disclosed a technology utilizing augmented reality (hereinafter abbreviated AR) to perform three-dimensional navigation on a route to a target attraction or on display information of products recommended by a shop side in a theme park or a shopping mall (see, for example, Patent Literature 1). More specifically, it is a technology to calculate the position and posture of a mobile information terminal at a time of imaging, and use a marker shown on the image imaged by the mobile information terminal to display predetermined information, which is related to the marker in advance, in a manner overlaid on the imaged image. Note that the AR is a technology to display data of texts, figures, still images, moving images, and so on managed in a computer (hereinafter referred to as computer-graphics image data) in a manner overlaid on a real environment, so as to give supplementary information.

Further, there is known a technology such that products to buy are registered in a list in a mobile terminal in advance, and when the user walks near a product registered in the list, product information of this product is displayed on the mobile terminal (see, for example, Patent Literature 2).

Similarly, there have been developed several technologies for navigating to a vacant space in a parking lot. In a shopping center, amusement park, or large public parking lot, it is difficult for the driver of a car to comprehend where there is a vacant space, and hence guidance information is necessary. Accordingly, in certain parking lots, for example, sensors are provided in respective parking spaces for detecting parking statuses. Then, the parking lot is divided into plural blocks, and guidance of vacant space is given to the driver by displaying "full", "vacant", or the like in each block on an electric sign or the like.

However, even when "full", "vacant" or the like is displayed at the entrance of each block, the driver is not able to comprehend the status of "full" or "vacant" unless he or she actually gets close to this block. Alternatively, there are also parking lots employing an electric sign listing information of the parking lot, but it is difficult for a driver to reach his/her target space by looking at the electric sign while driving. Further, one-way passages are often set in the parking lot, where there is a problem that even when the driver finds "vacant", it is still difficult for the driver to reach a vacant parking space.

To solve such problems, for example, Patent Literature 3 disclosed a system to reflect vacant statuses of a parking lot on a car navigation system. The method of Prior Art Literature 1 detects a car which is about to leave a vacant space, and this situation is transmitted to a car navigation system of another car, thereby guiding a vacant space existing in the vicinity.

Similarly, in the field of ships, various navigation technologies have been developed. In operation of a ship, there is performed navigation with marine charts particularly in old days, or navigation utilizing a radar device, GPS, and/or the like nowadays. Incidentally, in the case of a ship cruising in a coastal area, the above-described equipment is fully used for avoiding any trouble related to obstacles below sea level, such as stranding on a reef. Also, not limited in coastal areas, not only visual observation but also information from equipment is utilized on the sea in order to avoid contacting with another ship due to dense fog or the like.

Although it is possible to increase avoidance of stranding or contacting with another ship by utilizing these devices, there is demanded a system which is capable of detecting and avoiding hazards more intuitively. For example, Non-Patent Literature 1 disclosed a system which three-dimensionally displays an automatic identification system (AIS) and an electronic marine chart in combination. However, eventually, a shipman is required to understand a graph display as shown in FIG. 7 of Non-Patent Literature 1, and judge collision or the like.

Although it is possible to increase avoidance of stranding or contacting with another ship by utilizing these devices, there is demanded a system which is capable of detecting and avoiding hazards more intuitively. For example, Non-Patent Literature 1 disclosed a system which three-dimensionally displays an automatic identification system (AIS) and an electronic marine chart in combination. However, eventually, a shipman is required to understand a graph display as shown in FIG. 35 of Non-Patent Literature 1, and judge collision or the like.

CITATION LIST

Patent Literature

Patent Literature 1: Japanese Laid-open Patent Publication No. 2004-48674
Patent Literature 2: Japanese Laid-open Patent Publication No. 10-198731

Patent Literature 3: Japanese Laid-open Patent Publication No. 2006-209429

Non Patent Literature

Non-Patent Literature 1: "Intermediate report of study on collision and strand avoiding system as fail safe", Junji Hukuto and three others, [online], [searched on Feb. 10, 2010], Internet <http://www.nmri.go.jp/main/publications/paper/pdf/2A/03/00/PNM2A030043-00.pdf>

SUMMARY OF INVENTION

Technical Problem

However, in order to allow intuitive understanding in an environment where the status changes constantly, it is demanded to present information in a state as close as possible to the reality and instantly perceivable with respect to the timing of obtaining information, the type of information, and so on.

The present invention is made in view of such a problem, and it is an object thereof to provide strengthened perception for allowing intuitive understanding by displaying information in real time in an overlaid manner at arbitrary timing by utilizing an augmented reality technology considering the current status of a navigation target in a constantly variable situation.

In the technology disclosed in Patent Literature 1, for example, it is possible that the navigation information may include information which is recommended by the shop side but is unnecessary for a user. On the other hand, the technology disclosed in Patent Literature 2 can display product information of a product to buy which is registered in the list in advance on the mobile terminal. However, it is not always the case that the user goes shopping at a time when a product is registered in the list, and thus it is possible that the product to buy is out of stock or the price of the product to buy is changed when the user goes shopping.

Moreover, in order to allow intuitive understanding in an environment where the status changes constantly, such as the price of product or inventory status, it is demanded to present information in a state as close as possible to the reality and instantly perceivable with respect to the timing of obtaining information, the type of information, and so on.

The present invention is made in view of such a problem, and it is a first object thereof to provide a support for facilitating obtaining product information or guidance information of a product to buy at arbitrary timing.

Besides that, for example, in the structure as in Patent Literature 3, the car navigation system or the like needs to store map information of parking lots, which poses a problem that the map information of the car navigation system needs to be updated every time the parking lot is renovated, or the like.

Furthermore, in order to allow intuitive understanding in an environment where the status changes constantly, such as the status of a vacant space in a parking lot, it is demanded to present information in a state as close as possible to the reality and instantly perceivable with respect to the timing of obtaining information, the type of information, and so on.

The present invention is made in view of such a problem, and it is a second object thereof to provide a technology which allows a driver to find and reach a target vacant space, without updating map information of the car navigation system provided in a car, or even when the car navigation system is not provided in the car.

Besides that, in order to allow intuitive understanding in an environment where the status changes constantly, such as operation of a ship for example, it is demanded to present information in a state as close as possible to the reality and instantly perceivable with respect to the timing of obtaining information, the type of information, and so on.

The present invention is made in view of such a problem, and it is a third object thereof to provide information which is beneficial while a ship is cruising in a manner that a shipman or the like can intuitively comprehend the situation.

Solution to Problem

Accordingly, an information processing system of the present invention is an information processing system having an augmented reality presenting device capable of combining an image in real space with computer-graphics image data and displaying the combined image and a managing device managing at least one of inventory information and sales information of respective products posted on a flier, wherein the augmented reality presenting device has: an imaging unit obtaining image data related to a product posted on the flier by imaging; and a first transmitting unit transmitting the image data related to the product obtained by the imaging unit to the managing device, wherein the managing device has: a first obtaining unit determining, upon reception of the image data related to the product from the augmented reality presenting device, the product by analyzing the image data related to the product, and obtaining at least one of the inventory information and the sales information of the product; and a second transmitting unit transmitting at least one of the inventory information and the sales information of the product obtained by the first obtaining unit to the augmented reality presenting device, and wherein the augmented reality presenting device further has a presenting unit combining computer-graphics image data indicating at least one of the inventory information and the sales information of the product transmitted from the managing device with an image of the flier in real space and presenting the combined image.

Accordingly, an information processing apparatus of the present invention has: a vacant space information obtaining unit obtaining vacant space information of a parking lot; a vehicle information obtaining unit obtaining a position and a direction of a car in the parking lot; a vacant space determining unit determining a vacant space existing in a traveling direction of the car based on the vacant space information obtained in the vacant space information obtaining unit, the position and the direction of the car in the parking lot obtained in the vehicle information obtaining unit, and information related to position information of respective vacant spaces of a parking lot map stored in a storage device; an image generating unit generating a virtual space image in the parking lot which includes a vacant space object indicating the vacant space determined in the vacant space determining unit and indicates a position of the vacant space; and a transmitting unit transmitting the virtual space image generated in the image generating unit to the car.

Further, an information processing apparatus of the present invention has: a vacant space information obtaining unit obtaining vacant space information of a parking lot; a vehicle information obtaining unit obtaining a position and a direction of a car in the parking lot; a vacant space determining unit determining a vacant space existing in a traveling direction of the car based on the vacant space information obtained in the vacant space information obtaining unit, the position and the direction of the car in the parking lot obtained in the vehicle information obtaining unit, and information related to position information of respective vacant spaces of a parking lot map stored in a storage device; and a transmitting unit transmitting to the car a vacant space object indicating the vacant space determined in the vacant space determining unit and position information representing a position of the vacant space.

Accordingly, the present invention is an image display system including a position information obtaining device obtaining position information of a ship, an information storage device storing an electronic marine chart including seafloor shapes and a tide table, an image display device, and an image providing device providing an image to the image display device, wherein the image providing device obtains a depth below sea level at a position of the ship based on the position information of the ship obtained in the position information obtaining device, the tide table, and information related to depths indicated on the electronic marine chart, creates a virtual space image of a seafloor shape below sea level at the depth at the position of the ship based on the position information, the depth below sea level, and seafloor topography image data indicated on the electronic marine chart, and provides the virtual space image to the image display device, and wherein the image display device displays the virtual space image of the seafloor shape provided by the image providing device in a manner overlaid on a view from the image display device.

Advantageous Effects of Invention

According to the present invention, in order to allow intuitive understanding in a navigation technology in an environment where the status changes constantly, it becomes possible to present information in a state as close as possible to the reality and instantly perceivable with respect to the timing of obtaining information, the type of information, and so on.

For example, according to the present invention, it is possible to provide a support for facilitating obtaining product information or guidance information of a product to buy at arbitrary timing.

Besides that, for example, according to the present invention, it is possible to provide a technology which allows a driver to easily find and reach a target vacant space, without updating map information of the car navigation system provided in a car, or even when the car navigation system is not provided in the car.

Besides that, for example, according to the present invention, it is possible to provide information which is beneficial while a ship is cruising in a manner that a shipman or the like can intuitively comprehend the situation.

BRIEF DESCRIPTION OF DRAWINGS

FIG. 3A is a flowchart illustrating the flow of registration processing of product to buy in the shopping navigation system of Embodiment 1.

FIG. 3B is a flowchart illustrating presentation processing of product information of a product to buy and navigation processing from a current location to a shop in the shopping navigation system of Embodiment 1.

FIG. 9 is a diagram schematically illustrating an example of a database structure of a product information DB.

FIG. 11B is a flowchart illustrating presentation processing of product information of a product to buy and navigation processing from a current location to a shop in the shopping navigation system of Embodiment 2.

DESCRIPTION OF EMBODIMENTS

Hereinafter, embodiments of the present invention will be described based on the drawings.

Embodiment 1

Figure 1:
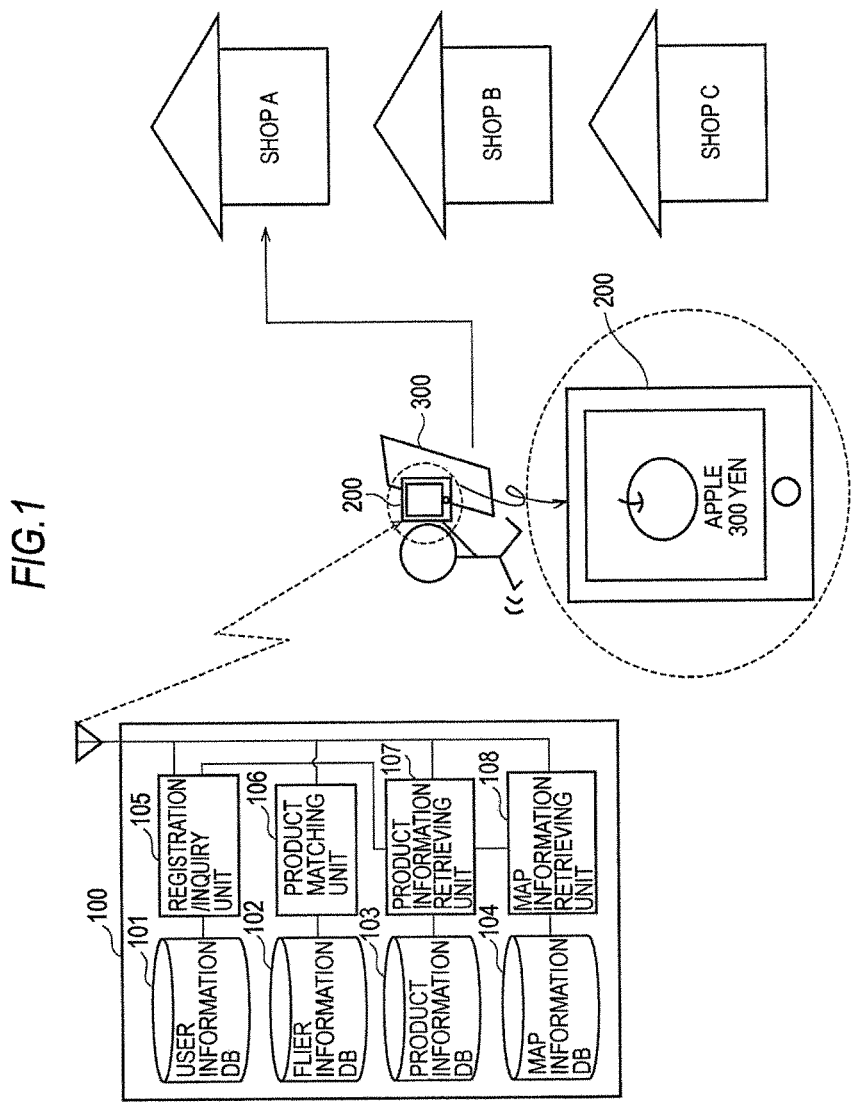
FIG. 1 is a diagram schematically illustrating a structure of a shopping navigation system of Embodiment 1.

FIG. 1 is a diagram schematically illustrating a structure of a shopping navigation system of Embodiment 1. As illustrated in FIG. 1, the shopping navigation system according to this embodiment includes a shopping management server 100 and a mobile terminal 200, which are connected communicably via a wireless communication line.

The user browses a flier 300 and chooses a product to buy from products posted on the flier 300. The user then points at the chosen product to buy and captures this state in the angle of view of an imaging unit of the mobile terminal 200, and then the imaging unit generates image data of the state pointing at the product to buy. The mobile terminal 200 detects image data of the product to buy from the image data generated by the imaging unit. As a method for detecting image data of the product to buy, it is conceivable that, for example, several finger shape patterns of a finger in a pointing state are prepared, and when image data which match or similar to these shape patterns of the finger are detected in the image data, the image data are recognized as the finger, and an object existing within a certain distance from the finger in the direction of the finger is detected as a product to buy.

Upon detection of the image data of the product to buy, the mobile terminal 200 transmits the image data of the product to buy to the shopping management server 100. Upon reception of the image data of the product to buy from the mobile terminal 200, the shopping management server 100 judges in a product matching unit 106 conformity between the image data of the respective products posted on the flier 300, which are stored in a flier information DB 102, and the image data of the product to buy received from the mobile terminal 200, and judges whether or not the product to buy is a product posted on the flier 300. When the product to buy is a product posted on the flier 300, a registration/inquiry unit 105 correlates the product to buy and the user and stores them in a user information DB 101. Thus, the product to buy of the user is registered in the shopping management server 100.

After the product to buy is registered in the shopping management server 100, if the user wants to know transition of price information and inventory information of the product to buy, the user holds the mobile terminal 200 over the flier 300 again, and captures the product to buy in the angle of view of the imaging unit of the mobile terminal 200. Thus, the image data of the product to buy are transmitted from the mobile terminal 200 to the shopping management server 100. By analyzing the image data received from the mobile terminal 200, the product matching unit 106 of the shopping management server 100 detects that the image data are image data of the product posted on the flier 300. Then, the registration/inquiry unit 105 judges that this product is the product to buy of the user. Then, a product information retrieving unit 107 obtains the latest (current) product information such as selling price and inventory information of the product to buy, and transmits the information to the mobile terminal 200. The mobile terminal 200 combines the computer-graphics image data indicating the latest product information of the product to buy and an image in real space, and displays the combined image on a display. At this time, the computer-graphics image data indicating the product information are combined with the image in real space so that the image data are displayed in the vicinity of the product to buy, so as to make it easy to comprehend that the product information is related to the product to buy.

A map information retrieving unit 108 obtains current location information of the mobile terminal 200, obtains address information of a shop which sells the product to buy, and obtains map information including the position indicated by the current location information and the position indicated by the address information from a map information DB 104. Then, by using the obtained map information, the map information retrieving unit 108 generates guidance information for guidance on a route from the current location of the mobile terminal 200 to the shop selling the product to buy, and transmits the information to the mobile terminal 200. By using the guidance information, the mobile terminal 200 combines computer-graphics image data for guidance on the route from the current location to the shop selling the product to buy with an image in real space, and displays the combined image. Thus, by capturing a street in the angle of view of the imaging unit of the mobile terminal 200, the user can move to the shop while confirming on the display of the mobile terminal 200 the image in which the route guidance by computer-graphics image data is combined with the image in real space of the street.

In this embodiment, augmented reality is presented by displaying the computer-graphics image data at a position which matches with an image in real space on the display of the mobile terminal 200. Hereinafter, display of computer-graphics image data which gives such augmented reality may also be referred to as AR (Augmented Reality) display. Note that there are various types of HMDs such as non-transmissive type, video transmission type and optical transmission type. Combination display (AR display) refers to overlay display of computer-graphics image data at a matching position on an image in real space projected on a lens part of the HMD of any type. For example, for the optical transmission type, overlay display on a see-through image in real space is performed, and for the video transmission type, overlay display on an image in real space imaged by a video camera is performed.

Further, the above-described mobile terminal 200 assumes an AR display device of mobile terminal type which displays an image in real space imaged by an imaging unit on a display and displays computer-graphics image data in a combined manner on the displayed image in real space, but the AR display device applicable to this embodiment is not limited thereto. For example, it may be an AR display device (HMD) of eyeglass type worn on the head of the user, which displays computer-graphics image data at a position matching with the image in real space projected on a lens part in an optically transmitted manner, or it may be a head-up display type AR display device which is disposed in a line of slight from a driver's seat of a mobile vehicle, and displays computer-graphics image data in a combined manner on an image in real space which is projected in an optically transmitted manner.

Further, when computer-graphics image data are displayed in a manner matched with an image in real space, coordinate matching is performed between an object in the image in real space and the computer-graphics image data. A method for coordinate matching may be such that where the user possessing the mobile terminal 200 sees in real space through the imaging unit is estimated based on the position (latitude, longitude) and posture (direction, elevation angle) of the mobile terminal 200, and computer-graphics image data are combined so as to match with the estimated position. Another method is such that a marker is added to an object in real space, this marker is imaged by the imaging unit, the position of the marker is detected from the imaged image data, and computer-graphics image data are combined so as to match with the detected position. Moreover, the position of an object in real space may be detected by analyzing image data in real space captured by the imaging unit, and computer-graphics image data may be combined so as to match with the detected position.

Figure 2A:
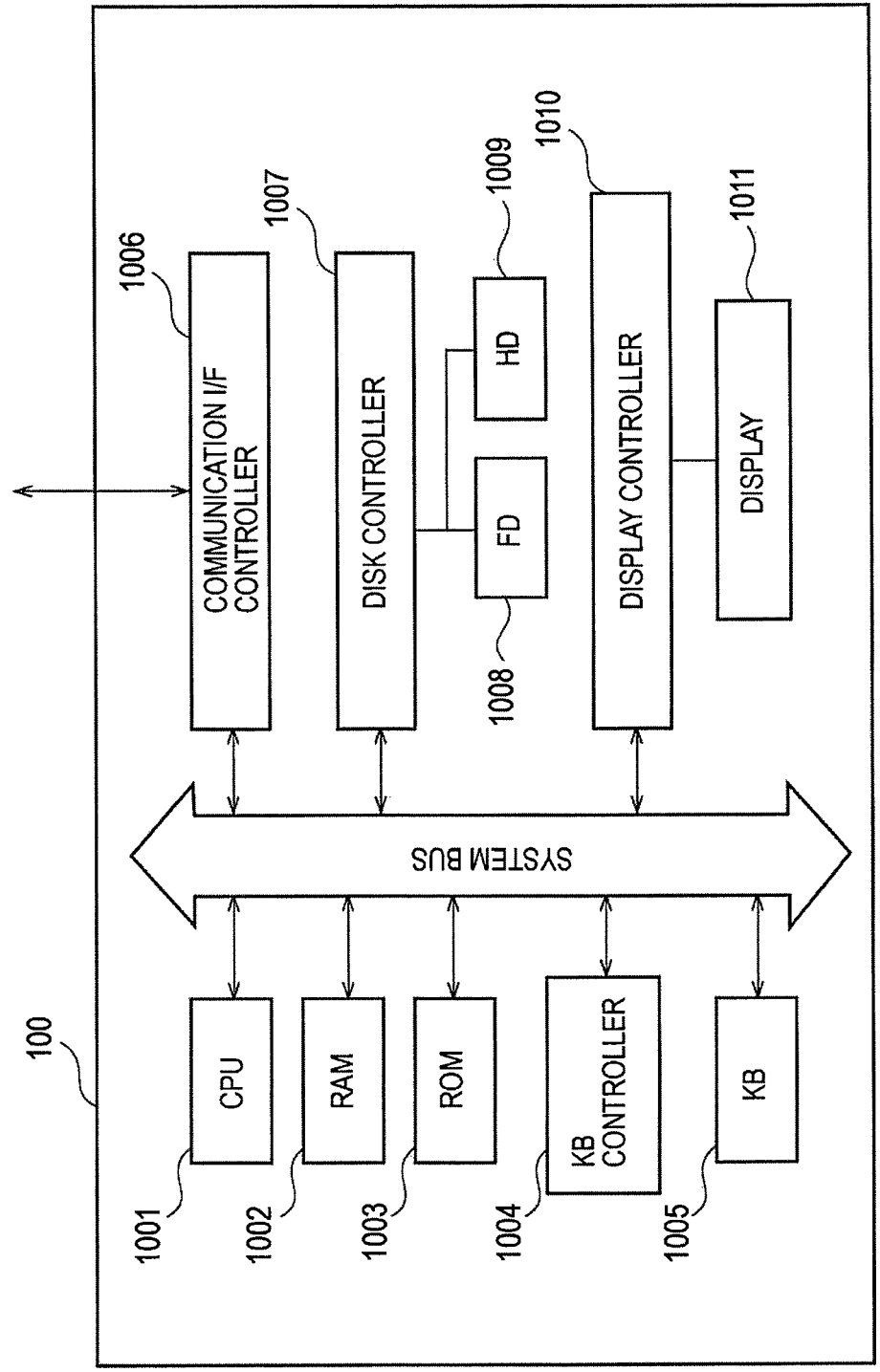
FIG. 2A is a diagram illustrating a hardware structure of a shopping management server.

FIG. 2A is a diagram illustrating a hardware structure of the shopping management server 100 according to this embodiment. A CPU 1001 performs overall control of respective devices and controllers connected to a system bus. In the ROM 1003 and the HD (hard disk) 1009, BIOS (Basic Input/Output System) which is a control program of the CPU 1001, an operating system program, for example a program of processing executed by the shopping management server 100 among processing illustrated in FIG. 3A and FIG. 3B, and so on are stored.

Note that although the HD 1009 is disposed inside the shopping management server 100 in the structure of the example illustrated in FIG. 2A, a structure equivalent to the HD 1009 may be disposed outside the shopping management server 100 as another embodiment. Further, a program for performing, for example, the processing illustrated in FIG. 3A and FIG. 3B according to this embodiment may be recorded in a computer readable recording medium such as a flexible disk (FD) or a CD-ROM and supplied from this recording medium, or may be supplied via a communication medium such as the Internet.

The RAM 1002 functions as a main memory, a work area, or the like for the CPU 1001. The CPU 1001 loads on the RAM 1002 a necessary program or the like when executing processing and executes the program to thereby realize various operations.

The HD 1009 and FD 1008 functions as an external memory. The CPU 1001 loads on the RAM 1002 a necessary program or the like when executing processing and executes the program to thereby realize various operations.

A disk controller 1007 controls access to the external memory such as the HD 1007 or the FD 1008. A communication I/F controller 1006 connects to the Internet, LAN, and the like and controls communication with an external unit by TCP/IP for example.

A display controller 1010 controls image display in a display 1011.

A KB controller 1004 accepts an operating input from a KB (keyboard) 1005, and transmits the operating input to the CPU 1001. Note that although not illustrated, besides the KB 1005, a pointing device such as a mouse is applicable to the shopping management server 100 according to this embodiment as an operating unit for a user.

The registration/inquiry unit 105, product matching unit 106, product information retrieving unit 107, and map information retrieving unit 108 illustrated in FIG. 1 are realized by, for example, a program which is stored in the HD 1009 and loaded on the RAM 1002 as necessary and by the CPU 1001 executing the program. Further, the user information DB 101, flier information DB 102, product information DB 103, and map information DB 104 are structures equivalent to a partial storage area in the HD 1009.

Figure 2B:
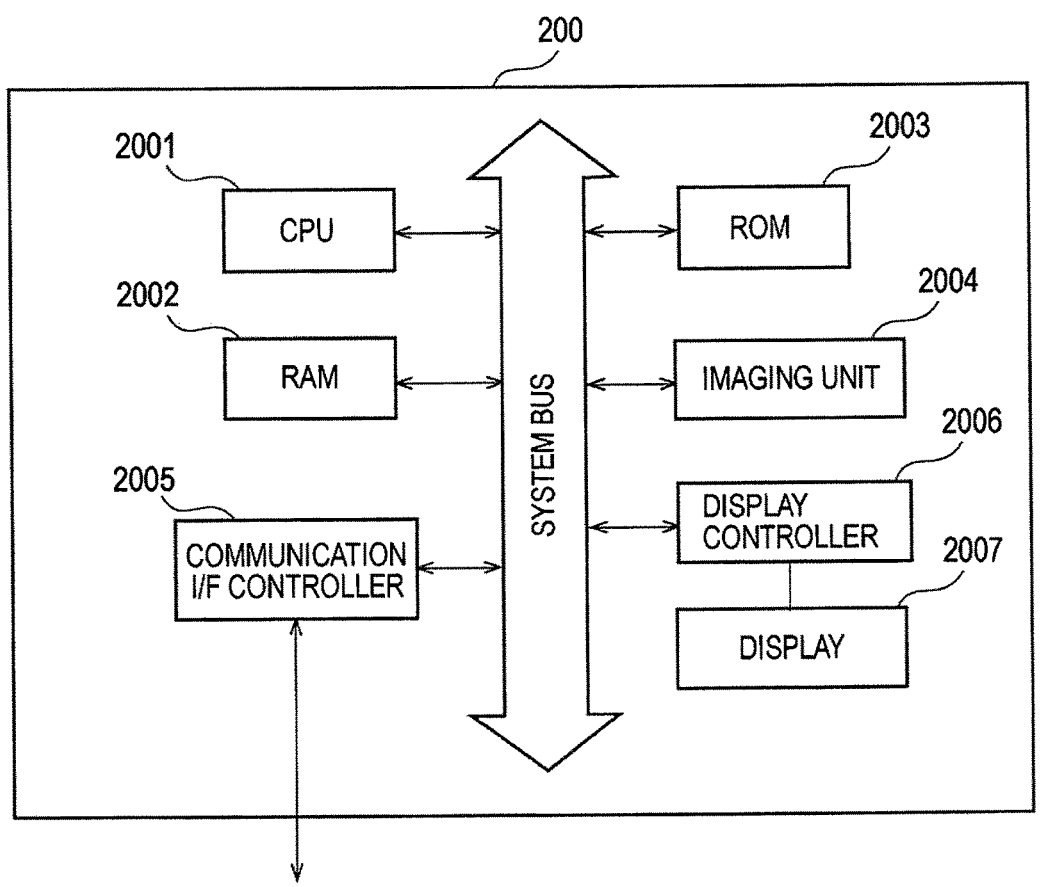
FIG. 2B is a diagram illustrating a hardware structure of a mobile terminal.

FIG. 2B is a diagram illustrating a hardware structure of the mobile terminal 200 according to this embodiment. A CPU 2001 performs overall control of respective devices and controllers connected to a system bus. In a ROM 2003, for example, a program of processing executed by the mobile terminal 200 among processing illustrated in FIG. 3A and FIG. 3B, and so on are stored. Note that a program for performing the processing illustrated in FIG. 3A and FIG. 3B may be supplied via a communication medium such as the Internet.

A RAM 2002 functions as a main memory, a work memory, or the like for the CPU 2001. The CPU 2001 loads on the RAM 2002 a necessary program or the like when executing processing and executes the program to thereby realize various operations. A communication I/F controller 2005 connects to the Internet, LAN, and the like and controls communication with an external unit by TCP/IP for example.

An imaging unit 2004 converts a subject image incident via an optical lens and formed on an imaging element into an electric signal, and outputs moving image data or still image data. A display controller 2006 controls image display on a display 2007. In this embodiment, a liquid crystal display is employed as the display 2007.

FIG. 3A is a flowchart illustrating the flow of registration processing of product to buy in the shopping navigation system according to this embodiment. The user first points at a product to buy posted on the flier 300, and captures this state in the angle of view of the imaging unit 2007 of the mobile terminal 200. Thus, in step S101 the imaging unit 2007 generates image data captured in the angle of view, and by analyzing the image data, the mobile terminal 200 detects image data of the product to buy specified by pointing. In step S102, the mobile terminal 200 transmits the image data of the product to buy detected in step S101 to the shopping management server 100.

Figure 4:
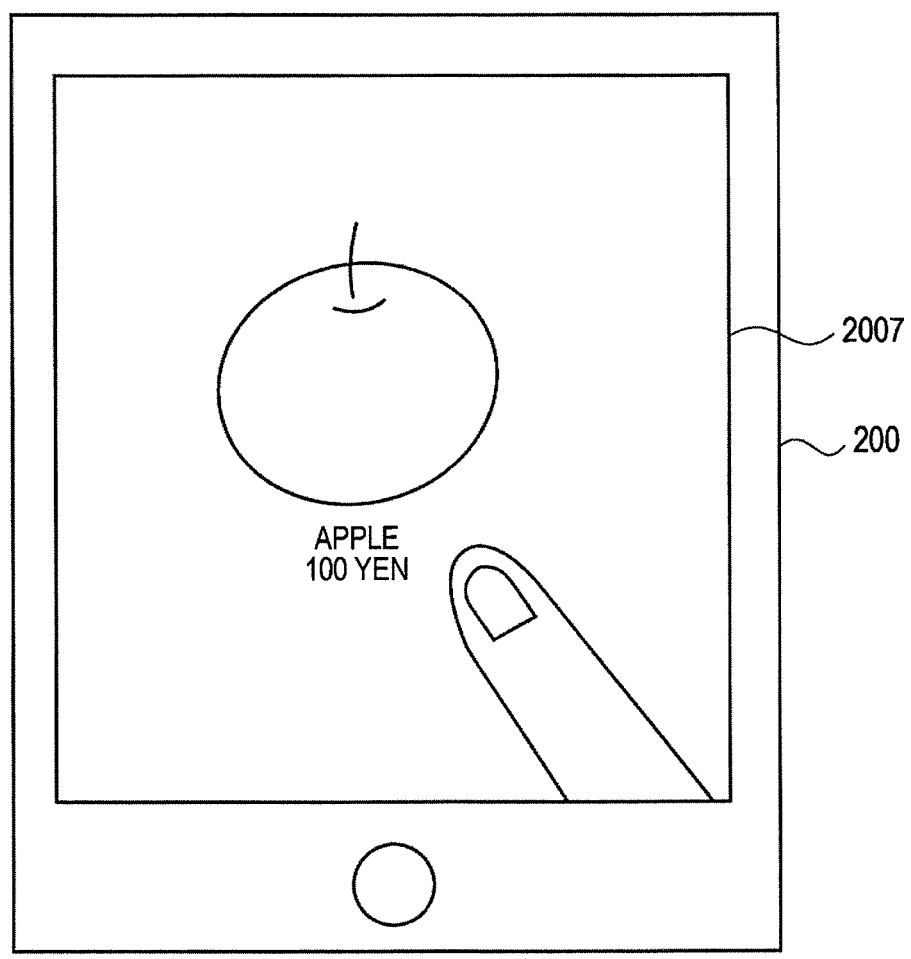
FIG. 4 is a diagram illustrating a state that a user points at a product to buy posted on a flier and this state is captured in the angle of view of an imaging unit of the mobile terminal.

FIG. 4 is a diagram illustrating a state that the user points at a product to buy posted on the flier 300, and this state is captured in the angle of view of the imaging unit 2007 of the mobile terminal 200. The user chooses and points at an apple as a product to buy out of the products posted on the flier 300. In the example of FIG. 4, the imaging unit of the mobile terminal 200 captures this state in the angle of view, and an image of the state that the user points at the product to buy (apple) on the flier 300 is displayed on the display 2007. Therefore, in the example of FIG. 4, image data of the apple is detected as image data of the product to buy. Note that besides the above-described method, for example, a product to buy may be specified such that the user moves his or her finger so as to surround the apple on the flier, and captures this movement in the angle of view of the imaging unit 2007. In this case, the mobile terminal 200 detects the trace of the user's finger, and judges that a product fitting in this trace is a product to buy. By employing the method of specifying a product to buy as described above, it is possible to simply specify a product to buy.

In step S201, the shopping management server 100 receives the image data of the product to buy from the mobile terminal 200. In step S202, the product matching unit 106 obtains the image data of the respective products posted on the flier 300 from the flier information DB 102, and compares them with the image data of the product to buy received from the mobile terminal 200. In step S203, the product matching unit 106 judges whether or not the product to buy is a product posted on the flier 300 by judging conformity between the image data of the product to buy and the image data of the products posted on the flier 300. This judgment of conformity is made such that pattern matching is performed between the image data of the product to buy and the image data of the products posted on the flier 300, and when it is judged that there is conformity or similarity therebetween, the product to buy is judged as a product posted on the flier 300. When it is judged that the product to buy is a product posted on the flier 300, the processing proceeds to step S204. On the other hand, when it is judged that the product to buy is not a product posted on the flier 300, the processing returns to step S201 and waits for reception of image data of a new product to buy.

Figure 7:
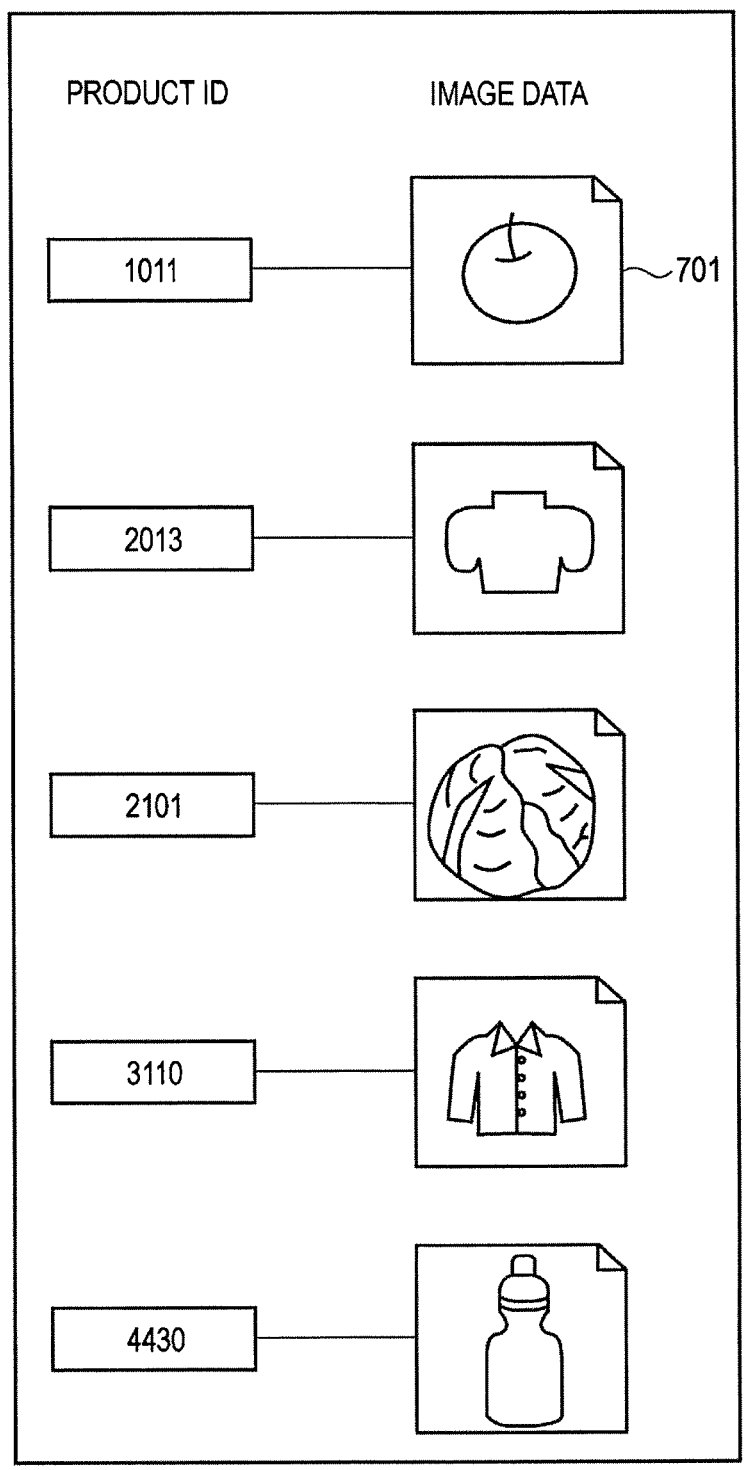
FIG. 7 is a diagram schematically illustrating an example of a database structure of a flier information DB.

FIG. 7 is a diagram schematically illustrating an example of a database structure of the flier information DB 102. In FIG. 7, the flier information DB 102 manages IDs of the respective products (product IDs) posted on the flier 300 and image data in correlation. When the shopping management server 100 receives the image data of the apple for example from the mobile terminal 200 in step S201, the product matching unit 106 judges in step S203 that, as a result of comparing the image data of the product to buy and the image data of the respective products posted on the flier 300, the image data of the product to buy matches or is similar to the image data of the apple of 701, and judges that the product to buy is the apple.

In step S204, the registration/inquiry unit 105 obtains the product ID correlated with the image data of the product judged as the product to buy from the flier information DB 102 via the product matching unit 106. Further, the registration/inquiry unit 105 obtains the user ID of the sender from header information of the image data of the product to buy received in step S201. Then, the registration/inquiry unit 105 registers the user ID and the product ID of the product to buy in correlation in the user information DB 101.

Figure 8:
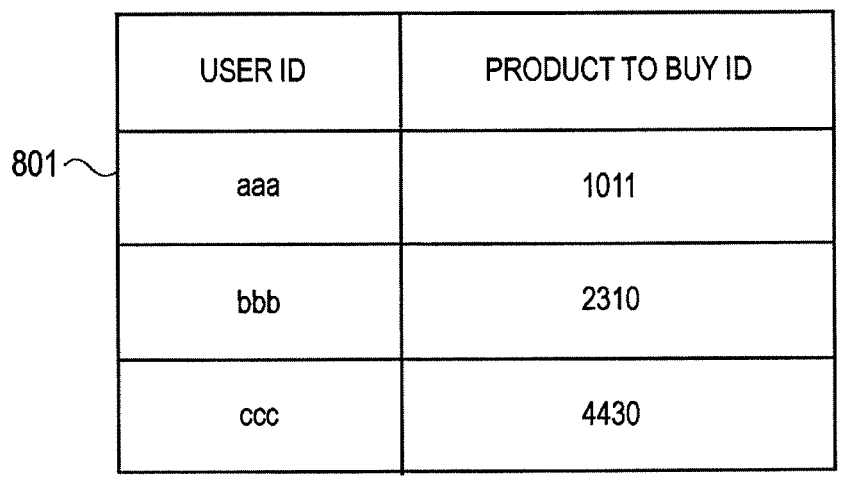
FIG. 8 is a diagram schematically illustrating an example of a database structure of a user information DB.

FIG. 8 is a diagram schematically illustrating an example of a database structure of the user information DB 101. In FIG. 8, the user information DB 101 manages user IDs and product to buy IDs in correlation. For example, when the product ID of a product to buy is "1011", and a user ID "aaa" is obtained from the header information of image data of the product to buy, the user ID "aaa" and the product to buy ID "1011" are managed in correlation as illustrated in the record of 801.

FIG. 3B is a flowchart illustrating presentation processing of product information of a product to buy and navigation processing from a current location to a shop in the shopping navigation system according to this embodiment. For example, when the user wants to comprehend the latest price information, inventory information, and the like of a product to buy which is already registered in the shopping management server 100, the user holds the mobile terminal 200 again over the product to buy posted on the flier 300, and captures the product to buy in the angle of view of the imaging unit 2007. Thus, in step S103, the imaging unit 2007 of the mobile terminal 200 generates image data of the product to buy. In step S104, the mobile terminal 200 transmits the image data of the product to buy to the shopping management server 100.

In step S205, the shopping management server 100 receives the image data of the product to buy from the mobile terminal 200. In step S206, the product matching unit 106 obtains the image data of the respective products posted on the flier 300 from the flier information DB 102, and compares them with the image data of the product to buy obtained from the mobile terminal 200. In step S207, the product matching unit 106 judges whether or not the product to buy is a product posted on the flier 300 by judging conformity between the image data of the product to buy and the image data of the products posted on the flier 300. When it is judged that the product to buy is a product posted on the flier 300, the processing proceeds to step S213. On the other hand, when it is not judged that the product to buy is a product posted on the flier 300, the processing returns to step S205.

In step S213, the registration/inquiry unit 105 obtains the product ID correlated with the image data of the product judged as the product to buy from the flier information DB 102 via the product matching unit 106. Further, the registration/inquiry unit 105 obtains the user ID of the sender from header information of the image data received in step S205. In step S208, the registration/inquiry unit 105 judges whether or not the product ID obtained in step S213 is managed in the user information DB 101 in correlation with the aforementioned user ID. When the product ID and the user ID are correlated, the processing proceeds to step S209. On the other hand, when the product ID and the user ID are not correlated, the processing returns to step S205.

In step S209, the product information retrieving unit 107 retrieves product information corresponding to the product ID obtained in step S213 from the product information DB 103, and transmits the information to the mobile terminal 200.

FIG. 9 is a diagram schematically illustrating an example of a database structure of the product information DB 103. In FIG. 9, the product information DB 103 manages product IDs, product names, prices (price 1, price 2, . . . ), shops, stock quantities, and product attributes in correlation. As the product attributes, when the product is food, place of production, production date, and so on are managed, and when the product is clothes, color, size, and so on are managed. Further, data managed in the product information DB 103 may be updated at arbitrary timing in cooperation with a POS system (Point Of Sales system) which is not illustrated in FIG. 1. For example, when the product ID obtained in step S213 is "1011", a record of 901 is retrieved in step S209 from the product information DB 103 illustrated in FIG. 9, and the product information registered in the record 901 is transmitted to the mobile terminal 200. Note that regarding the price and stock quantity included in the product information, latest information is transmitted to the mobile terminal 200. In the product information DB 103, the price of the product posted on the flier 300 is registered as an initial price (price 1), and a price is registered in addition every time the price is updated (price 2, price 3, . . . ). In step S209, from histories of prices recorded in this manner, the price registered at last is transmitted to the mobile terminal 200. Thus, in the mobile terminal 200, the latest (current) price of the product to buy is displayed. Note that the product information DB 103 may be of the type in which price histories are managed, and the price itself is overwritten and only the latest price is managed. Further, in the product information DB 103, the stock quantity is overwritten at predetermined timing, and only the latest stock quantity is managed. Therefore, in step S209, the latest stock quantity is transmitted to the mobile terminal 200. Thus, in the mobile terminal 200, the latest stock quantity of the product to buy is displayed.

Figure 5:
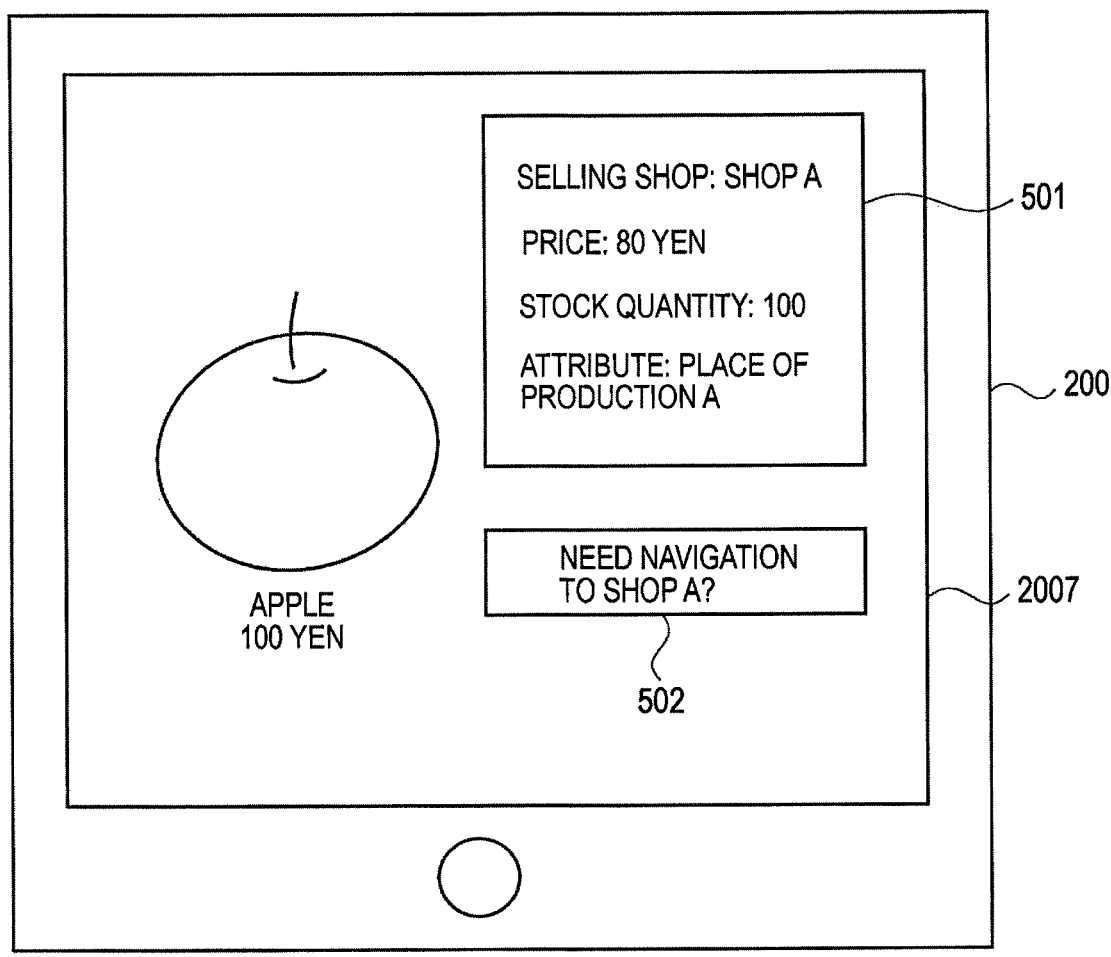
FIG. 5 is a diagram illustrating a display example combining computer-graphics image data of product information with an image in real space.

In step S105, the mobile terminal 200 receives the product information from the shopping management server 100. In step S106, the mobile terminal 200 combines computer-graphics image data of the received product information with an image in real space and displays the combined image. FIG. 5 is a diagram illustrating a display example combining computer-graphics image data of product information with an image in real space. In the example of FIG. 5, in the vicinity of the product to buy, computer-graphics image data illustrating product information 501 and computer-graphics image data illustrating a tag 502 which is an operating switch for requesting route guidance are displayed.

In step S110, the mobile terminal 200 judges whether there is a request for route guidance (navigation) or not. That is, the mobile terminal 200 judges whether the tag 502 is operated or not. When the tag 502 is operated, the processing proceeds to step S107. On the other hand, when the tag 502 is not operated, the processing is finished. In step S107, the mobile terminal 200 issues a request for route guidance to the shopping management server 100.

In step S210, the shopping management server 100 accepts the request for route guidance from the mobile terminal 200. In step S211, the map information retrieving unit 108 obtains current location information of the mobile terminal 200, and obtains shop information of a shop selling the product to buy from the product information retrieving unit 107. Note that the current location of the mobile terminal 200 can be obtained using GPS (Global Positioning System). Further, although not illustrated in FIG. 9, the product information DB 103 includes address information of the shop selling the product, and the map information retrieving unit 108 obtains the address information of the shop selling the product to buy from the product information DB 103 via the product information retrieving unit 107. In step S211, the map information retrieving unit 108 retrieves map information including the position indicated by the current location information of the mobile terminal 200 and the position indicated by the address information of the shop selling the product to buy. In step S212, the map information retrieving unit 108 generates guidance information for guiding a route from the current location of the mobile terminal 200 to the shop selling the product to buy using the retrieved map information, and transmits the information to the mobile terminal 200.

In step S108, the mobile terminal 200 receives the guidance information from the shopping management server 100. In step S109, the mobile terminal 200 uses the received guidance information, and combines computer-graphics image data guiding the route from the current location of the mobile terminal 200 to the shop selling the product to buy with the image in real space, and displays the combined image on the display 2007.

In the above-described embodiment, when the user wants to know product information of a product to buy which is registered in advance, the user can easily obtain the latest product information such as stock quantity, price, and so on of the product to buy by performing a predetermined specifying operation on the product to buy on the flier, and capturing this in the angle of view of the imaging unit 2004. Further, in order to enable notification of product information of the product to buy to the mobile terminal 200 when the correlation between the user ID and the product ID of the product to buy is registered in the user information DB 101, step S209 of FIG. 3B may be executed after step S204 of FIG. 3A. That is, when the shopping management server 100 registers the correlation between the user ID and the product ID of the product to buy in the user information DB 101 in step S204, the server retrieves the product information corresponding to the product ID from the product information DB 103 in subsequent step S209, and transmits this information to the mobile terminal 200. In this manner, it becomes possible to notify the product information of the product to buy to the mobile terminal 200 when the correlation between the user ID and the product ID of the product to buy is registered.

Note that in the above-described embodiment, it is necessary for the user to hold the mobile terminal 200 over the flier 300 again in the presentation processing of the product information of the product to buy, but it is not limited thus. Another embodiment in which it is not necessary to hold the mobile terminal 200 over the flier 300 again will be described with respect mainly to differences from the above-described embodiment.

Embodiment 2

Figure 10:
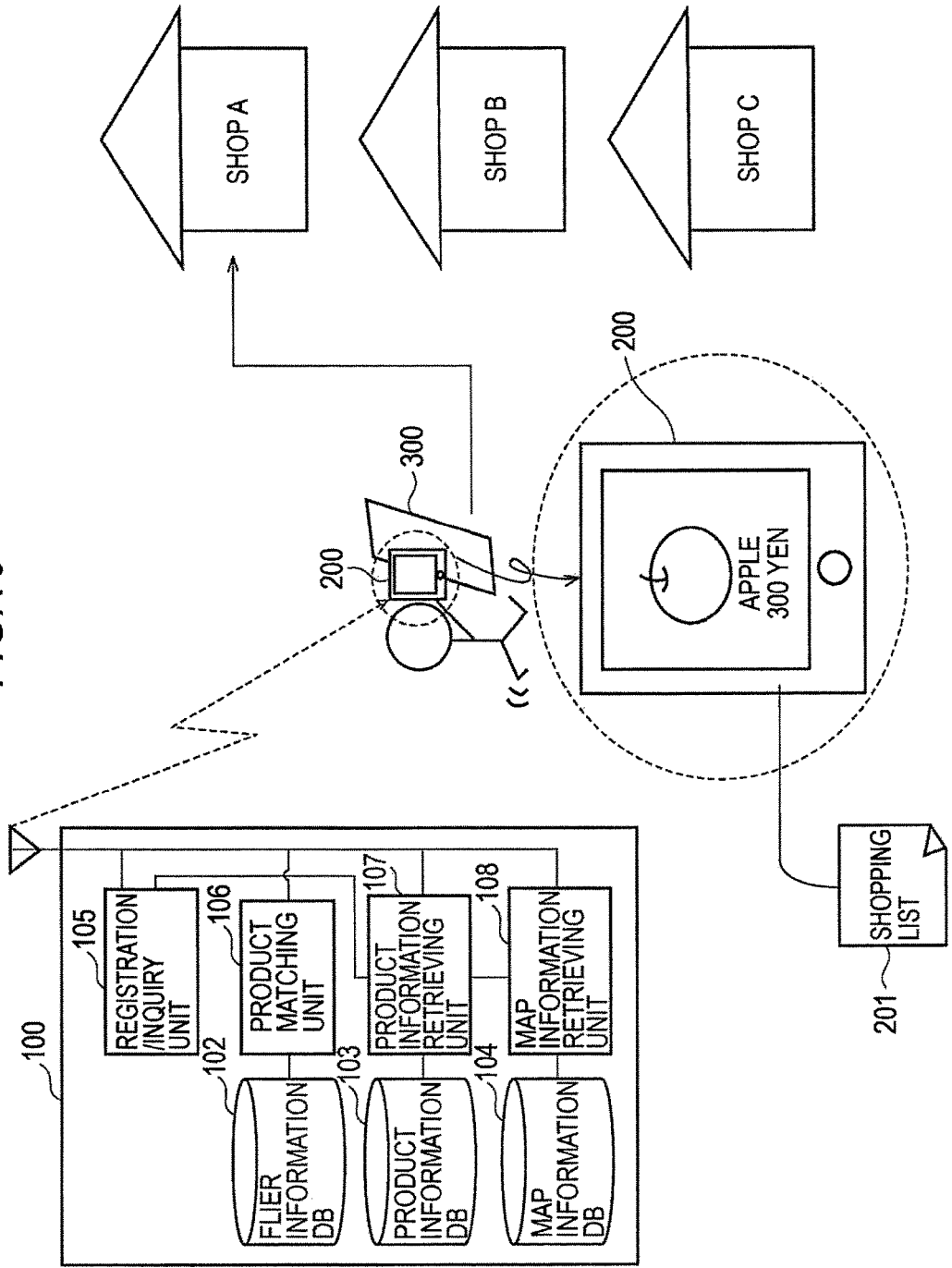
FIG. 10 is a diagram schematically illustrating a structure of a shopping navigation system of Embodiment 2.
Figure 12:
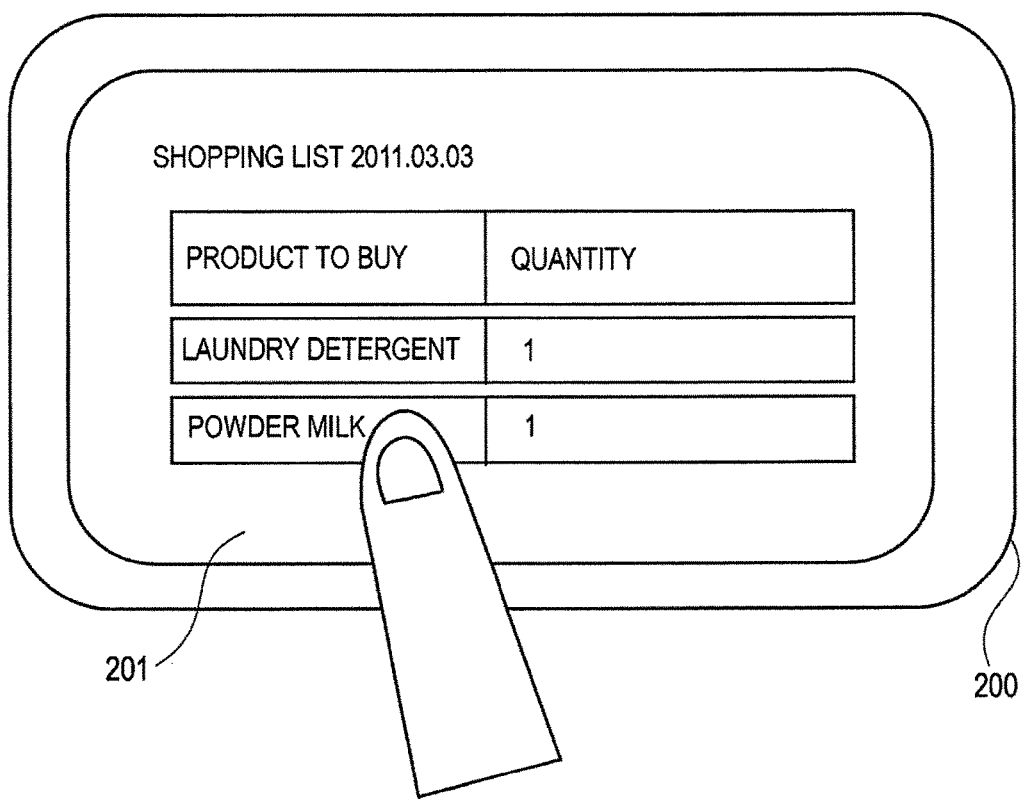
FIG. 12 is a diagram illustrating an example of a shopping list.

FIG. 10 is a diagram schematically illustrating a structure of a shopping navigation system of Embodiment 2. As illustrated in FIG. 10, the system of this embodiment does not include the user information DB 101 in the shopping management server 100, and instead a shopping list 201 is included in the mobile terminal 200, as compared to the system of the above-described embodiment. Note that the shopping list 201 is a file recording product IDs of products to buy, and is managed in correlation with a product image, a product name, and so on as illustrated in FIG. 12 for example.

Figure 11A:
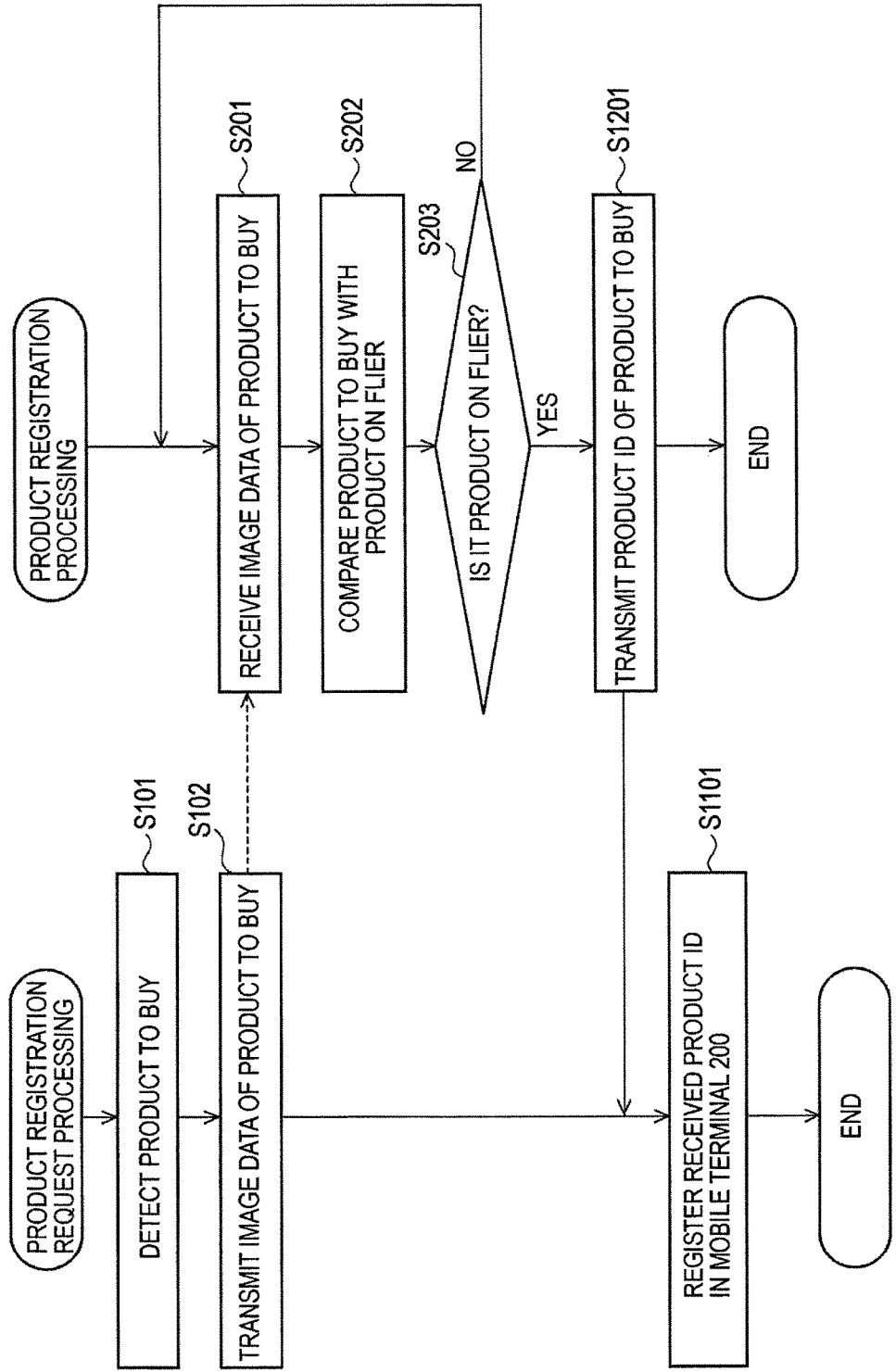
FIG. 11A is a flowchart illustrating the flow of registration processing of a product to buy in the shopping navigation system of Embodiment 2.

FIG. 11A is a flowchart illustrating the flow of registration processing of a product to buy in the shopping navigation system according to this embodiment. As compared to FIG. 3A, step S1101 is added, and step S1201 is added as an alternative to step S204 being deleted.

In step S1201, the registration/inquiry unit 105 obtains a product ID correlated with image data of a product judged as a product to buy from the flier information DB 102 via the product matching unit 106. Then, the obtained product ID is transmitted to the mobile terminal 200.

In step S1101, the product ID is received from the mobile terminal 200. Then, the obtained product ID is stored in the ROM 2003.

Next, FIG. 11B is a flowchart illustrating presentation processing of product information of a product to buy and navigation processing from a current location to a shop in the shopping navigation system according to this embodiment. As compared to FIG. 3B, step S1102 is added as an alternative to step S103 and step S104 of FIG. 3B being deleted. Further, step S1202 is added as an alternative of step S205 to step S208 of FIG. 3B being deleted. Hereinafter, this embodiment will be described mainly focusing on differences from the above-described embodiment.

For example, when the user wants to comprehend the latest price information, inventory information, and the like of a product to buy which is already registered in the mobile terminal 200 in step S1101 of FIG. 11A, the mobile terminal 200 transmits the product ID of the product to the shopping management server 100 in step S1102 of FIG. 11B. A method of determining the product ID of this product is such that, for example, a shopping list is displayed on the mobile terminal 200 as illustrated in FIG. 12, and when a product name displayed on the shopping list is tapped, the product ID registered in the mobile terminal 200 corresponding to this product name is chosen and transmitted to the shopping management server 100.

In step S1202, the shopping management server 100 obtains the product ID. After this, the server proceeds to the processing of step S209 similarly to FIG. 3B. With the structure of this embodiment, the user does not need the flier 300 when obtaining inventory information or price information of a product to buy, and hence easier obtainment is possible.

Note that in the above-described embodiment, when the user chooses a product to buy from the products posted on the flier 300, product information of the product to buy in a shop selling this product to buy is AR displayed, but it is not limited thus. For example, it is possible that the product to buy of the user is sold in plural shops. In such a case, it is possible that in above-described step S209 product information in the plural shops selling the product is retrieved, and the product information is AR displayed. Specifically, the correlation of image data of products of plural shops and product IDs is managed in the flier information DB 102. When plural sets of image data of the product matching with or similar to the image data of a product to buy exist, and a combination of any one of the product IDs correlated with all sets of image data and the user ID recorded in the header of image data of the product to buy exists in the user information DB 101, all the product information corresponding to the product IDs may be obtained from the product information DB 103. Alternatively, another possible method is to determine all product IDs corresponding to the image data matching with or similar to the image data of the product to buy from the flier information DB 102. Alternatively, although not illustrated in FIG. 7, another possible method is such that a row for managing product names is added in the flier information DB 102, and a product name which is the same or similar to the product name of the product matching with or similar to the image data of the product to buy determines all the product IDs of the products managed in the row "product name". Alternatively, another possible method is to determine, rather than the image data of the product to buy, all the product IDs of products matching with or similar to the product name or the image data of the product which are managed in correlation with the product ID received from the mobile terminal 200. Then, all the pieces of obtained product information are transmitted from the shopping management server 100 to the mobile terminal 200, and in the mobile terminal 200, the product information of the plural shops can be AR displayed with respect to the product to buy.

Figure 6:
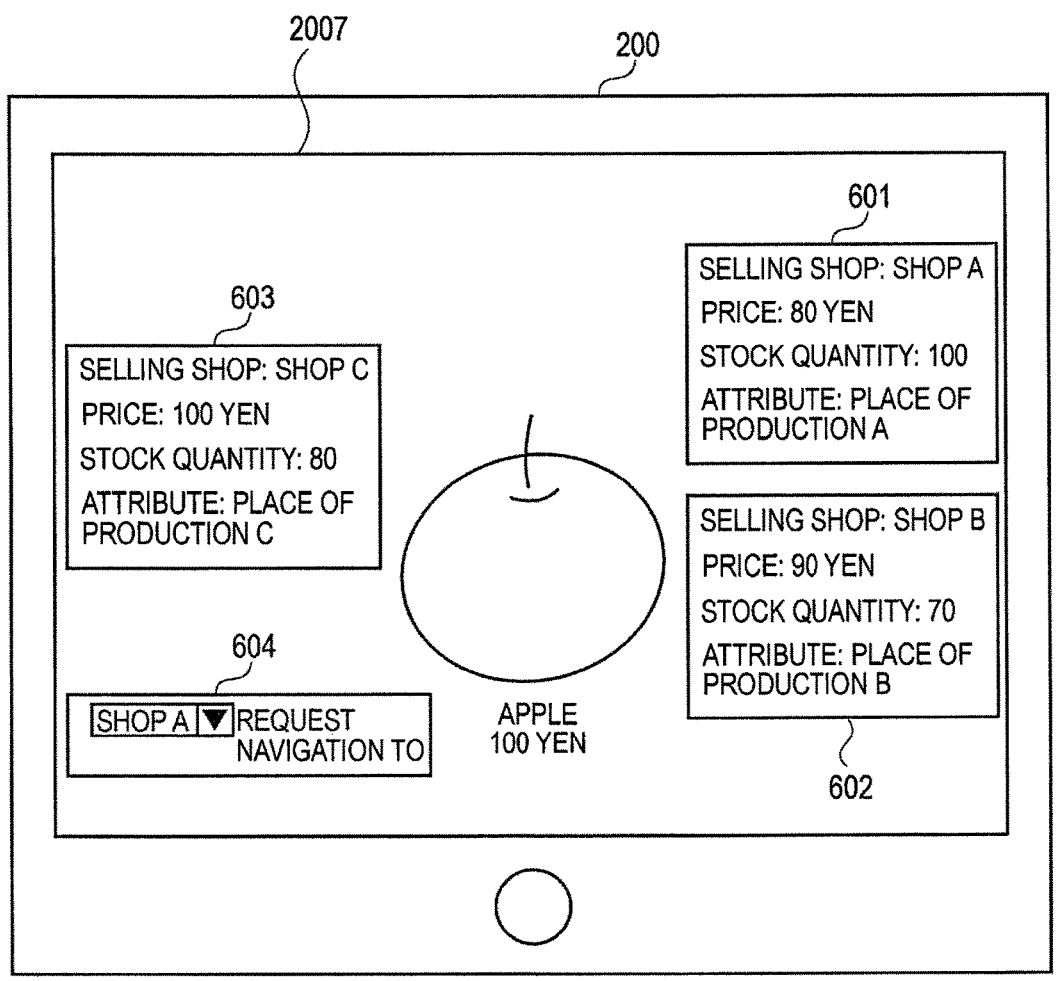
FIG. 6 is a diagram illustrating an example of AR display when product information of an apple, which is a product to buy of the user, of three shops is obtained.

FIG. 6 is a diagram illustrating an example of AR display when product information of an apple, which is a product to buy of the user, of three shops is obtained. In FIG. 6, numerals 601, 602, 603 denote product information related to apples in shop A, shop B, shop C, respectively, which indicate the current prices, stock quantities, and so on of the apples in the respective shops. Thus, the user can refer to the product information of the apples other than that of shop A which issued the flier. For example, if an apple is sold at a lower price than that of the shop A in a shop other than the shop A, or the apple is out of stock in the shop A but is in stock in another shop, the shopping destination may be changed to buy the apple in the other shop. In this case, in step S110, the mobile terminal 200 judges whether a tag 604 regarding the product is operated or not and which shop it is operated for among the plural shops for which the product information is AR displayed, and then in step S107 the mobile terminal 200 issues a request for route guidance to the relevant shop to the shopping management server 100. Note that in FIG. 6, the mode of choosing a shop in the tag 604 which is an operating switch for requesting route guidance is displayed as a pull-down menu, but any other mode is possible. For example, respective tags of the plural shops may be provided, or voice recognition recognizing a shop name vocalized by the user may be used.

Further, in the case where the user initially planned to buy the apple in the shop A but the apple is sold at a lower price in another shop than in the shop A, or the case where the apple is out of stock in the shop A but is in stock in another shop, the shopping management server 100 may detect this automatically, generate guidance information for navigating to the other shop for the mobile terminal 200, and transmit the information to the mobile terminal 200. At this time, the shopping management server 100 makes a comparison of product information in plural shops retrieved in above-described step S209 in step S211 and step S212, and generates guidance information based on a predetermined rule. This rule is stored in the ROM 1003 or HD (hard disk) 1009, and a conceivable example is to guide a route to the shop at the closest distance from the current location among the plural shops retrieved in step S209, or guide a route to the shop having the largest stock quantity among the plural shops retrieved in step S209, or separately obtain information indicating the congestion status of people in respective routes to the plural shops retrieved in step S209, and guide a route which allows smoothest passing. Note that rather than applying one rule fixedly, plural rules may be applied in combination, or a combination may be changed dynamically and applied. For example, when guidance information to the shop A is generated first by applying a rule "to guide a route to the shop at the closest distance", and then the shopping management server 100 refers to the product information DB 103 and comprehends that the product is out of stock while the user is on the way to the shop A based on the information AR displayed on the mobile terminal 200, the shopping management server 100 generates new guidance information based on another rule "to guide a route to the shop having the largest stock quantity", and AR displays this on the mobile terminal 200. Further, rather than guiding from the current location to a shop, it is also possible to guide the user to a location where the target product is displayed in a shop. Moreover, when the user has reached the vicinity of the target product but cannot find the product, the posture of the mobile terminal may be detected by the posture detection function of the mobile terminal 200, and where the user should look at may be guided.

Further, other examples of information which is AR displayed on the mobile terminal 200 include an alarm notifying that a product registered in the past is posted on a flier which the user is looking at, a discount price and a discount period of this product, and the like. Specifically, if the user registers a consumable product, for example a powder milk or a tissue paper, which is needed periodically by the method described in FIG. 3A, when the user holds the mobile terminal 200 over a flier which is issued thereafter and the registered product is posted on the flier, this product may be detected by the method described in FIG. 3B (steps S205 to S208), and the alarm and the discount price, discount period, and so on of the product may be transmitted to the mobile terminal 200 by the processing similar to step S209. Thus, information of alarm or the like is AR displayed in a state that the user looks at the flier through the mobile terminal 200.

Further, as another embodiment, the shopping management server 100 may automatically select a product corresponding to the user's taste from the flier, and guide the selected product or a shop selling this product to the user. More specifically, master information of the user is registered in the shopping management server 100. Information registered as the master information includes personal preferences (whether or not to focus on quality, whether or not to focus on seasonal products, whether or not having allergies, target weekly food cost, target daily calories, whether or not to desire increase in number of items with the same material and in the same cooking procedure to the middle, whether or not to desire shopping in nearby places), family preferences (father: less oil, child: meat-centered, adult: hot curry, child: mild curry), cooking histories (whether cooking is succeeded or failed, history of leftover, reaction of family), and so on. Further, the shopping management server 100 obtains flier information of respective shops. As a method for obtaining the flier information, there is a method to obtain images, prices, and so on of products from electronic flier data of the sites of the respective shops, or to image a flier inserted in a newspaper by a camera, and obtain images, prices, and so on of products from image data obtained by imaging. Note that the flier information may be obtained from flier information of plural, shops. For example, it is conceivable that flier information related to ingredients of curry is obtained from a shop A which is a supermarket, and flier information related to seasonings is obtained from a shop B which is a discount liquor shop. On the other hand, when the user observes a cooking program, a restaurant introducing program, a blog of a cuisine researcher, or a recommended cooking recipe on the mobile terminal 200 and operates a button labeled "looks delicious" for example on the screen, the mobile terminal 200 performs image recognition, voice recognition, text recognition, or the like to match the analysis result thereof and the master information and the flier information to select cooking ingredients and a selling shop.

The shopping management server 100 generates guidance information for guiding a route from the current location of the mobile terminal 200 to the selling shop based on the cooking ingredients and the selling shop selected in this manner, and transmits the information to the mobile terminal 200. The mobile terminal 200 combines, using the guidance information, computer-graphics image data guiding from the current location to the selling shop with an image in real space, and displays the combined image. Thus, the route to the shop where the cooking ingredients matching with preferences of the user can be purchased is guided automatically. Further, when the user moves into the selling shop and holds up the mobile terminal 200 in the shop, computer-graphics image data indicating product information such as prices, stock quantities, places of production, and so on of the cooking ingredients may be combined and displayed with an image in real space in which a shelf where the ingredients are displayed is shown, or computer-graphics image data of an arrow pointing at the position of the shelf may be combined and displayed with an image in real space.

Further, histories of cooking ingredients which the user has actually purchased may be registered in the master information, and may be used when cooking ingredients are selected next time. Moreover, histories of purchased cooking ingredients may be outputted as part of information of a housekeeping book.

In the above-described embodiment, although image data of a product to buy is imaged by the imaging unit 2004 when the product to buy is registered or product information of the product to buy is obtained, and the image data are transmitted from the mobile terminal 200 to the shopping management server 100, it is not limited thus. Specifically, when a marker corresponding to a product is posted on a flier, the marker may be imaged by the imaging unit 2004, and image data of the marker may be transmitted from the mobile terminal 200 to the shopping management server 100. The shopping management server 100 manages the correlation between markers and products, and identifies the product to buy corresponding to the marker by analyzing the received image data of the marker. Then, the shopping management server 100 compares IDs of respective products posted on the flier 300 stored in the flier information DB 102 with the ID of the product to buy, and when there is a matching product, the server judges that the product to buy is a product posted on the flier, and manages the user and the product to buy in correlation in the user information DB 101.

Further, when it is desired to obtain product information of this product to buy, the user likewise images the marker corresponding to the product to buy by the imaging unit 2004, and transmits image data of the marker from the mobile terminal 200 to the shopping management server 100. The shopping management server 100 identifies the product to buy corresponding to the marker by analyzing the received image data of the marker. Then, the shopping management server 100 compares IDs of respective products posted on the flier 300 stored in the flier information DB 102 with the ID of the product to buy. When there is a matching product, the shopping management server 100 judges whether or not the correlation between the ID of the product to buy and a user is registered in the user information DB 101. When the correlation between the ID of the product to buy and a user is registered in the user information DB 101, the product to buy is judged as one specified by this user in the past. Therefore, the shopping management server 100 transmits the product information of the product to buy to the mobile terminal 200 of this user. As described above, by using the markers corresponding to the products posted on the flier, product information of a product to buy can be obtained easily at arbitrary timing similarly.

Note that in the above-described embodiments, a flier is taken as an example and described, but the embodiments can be implemented similarly for any advertisement medium such as a poster posted in the street or a TV advertisement.

Embodiment 3

Hereinafter, Embodiment 3 will be described.

Figure 13:
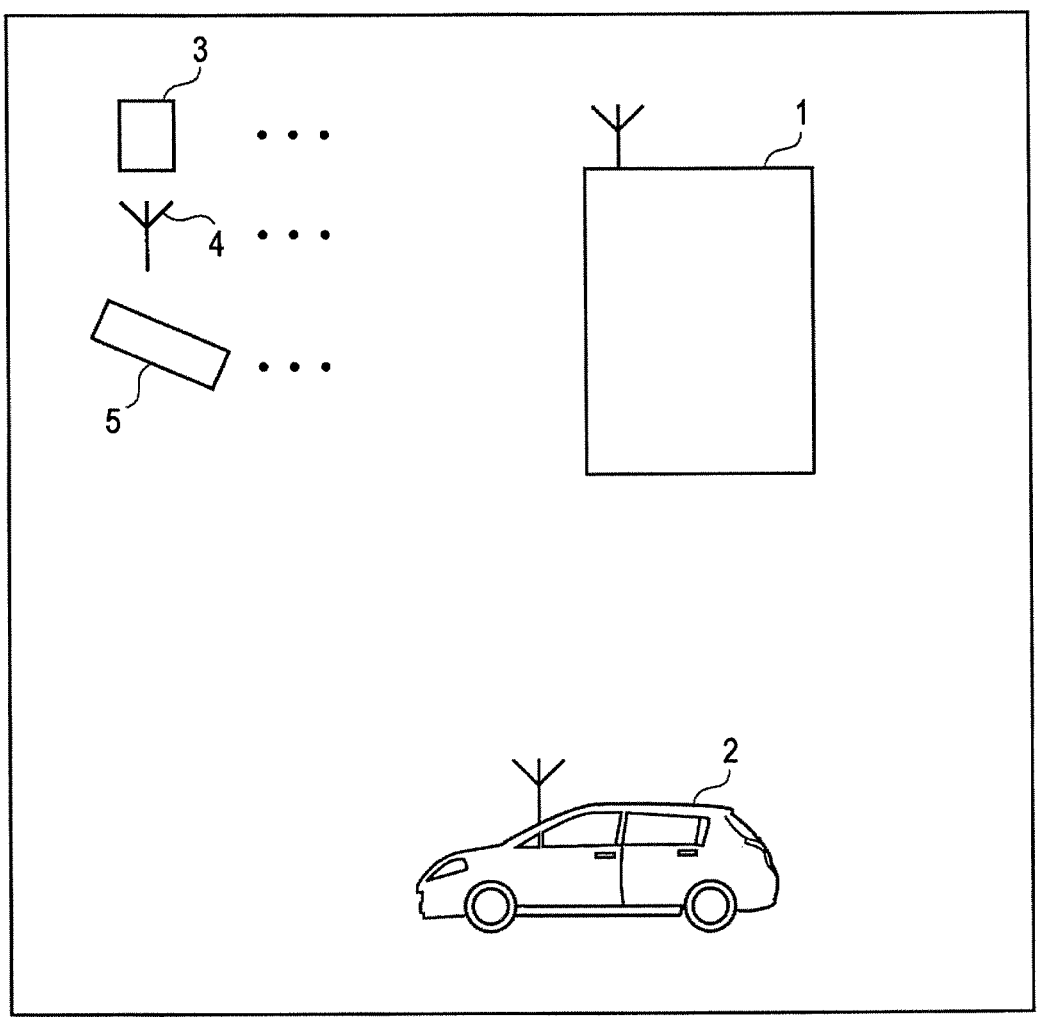
FIG. 13 is a diagram illustrating an example of a system structure of a vacant space guidance system.

FIG. 13 is a diagram illustrating an example of a system structure of a vacant space guidance system. As illustrated in FIG. 13, in the vacant space guidance system, plural sensors 3 disposed in respective spaces (car spaces) in a parking lot, plural antennas for wireless communication provided in the parking lot, plural parking lot cameras 5 provided in the parking lot, an information processing apparatus 1, and a car 2 in the parking lot are connected via a network.

The information processing apparatus 1 receives vacant space information in the parking lot from the plural sensors 3 wirelessly or via wire. Note that the sensors 3 may transmit to the information processing apparatus 1 a notification of a vacant space when a space becomes vacant, or may transmit to the information processing apparatus 1 information on whether a space is vacant or not at predetermined time intervals.

Further, the information processing apparatus 1 constantly receives images imaged by the parking lot cameras 5 wirelessly or via wire from the plural parking lot cameras 5. The information processing apparatus 1 obtains the position and direction of the car 2 based on the images received from the cameras 5. Describing more specifically, the information processing apparatus 1 has information correlating the parking lot cameras 5 and location information where the parking lot cameras 5 are disposed, determines location information where a parking lot camera 5 is disposed by an image from this parking lot camera 5, and determines the location of the car 2 shown on the image. Further, the information processing apparatus 1 obtains the direction of the car 2 by analyzing the image. Note that in the vacant space guidance system of this embodiment, a parking lot camera 5 is disposed at an entrance of the parking lot, and this parking lot camera 5 images the number plate of a car 2 which enters the parking lot. The information processing apparatus 1 can identify the car 2 based on this number plate, and extract the number plate from images of the car 2 sent from the plural parking lot cameras 5 so as to trace the car 2. That is, the information processing apparatus 1 constantly comprehends the current position and direction of the car 2 in the parking lot based on the images sent from the plural parking lot cameras 5.

The information processing apparatus 1 determines a vacant space existing in the traveling direction of the car 2 based on the vacant space information received from the plural sensors 3, the position and direction of the car 2 in the parking lot, and a parking lot map stored in a storage device 12 or the like, which will be described later. Note that the parking lot map is map data which manage at least a space ID identifying each car space in the parking lot, position information of a space identified based on the space ID, information related to standards such as the area, height, and so on of each space, and route information related to traveling directions in the parking lot. Further, the vacant space information indicates position information of a car space which became vacant, and may be information by which the position of a vacant space can be determined by verifying with the parking lot map, such as a space ID of a car space which became vacant or position information of the sensor provided in this vacant space for example. Then, the information processing apparatus 1 generates a virtual space image in the parking lot which includes a vacant space object indicating the vacant space and indicates the position of the vacant space according to the location (or position) of the determined space. The information processing apparatus 1 transmits the generated virtual space image to the car 2 via the plural antennas 4 for wireless communication provided in the parking lot.

When the car 2 receives the virtual space image, control is performed to project the virtual space image on a display of the car, and display the virtual space image in a manner overlaid on a view in the parking lot from the display.

Figure 14:
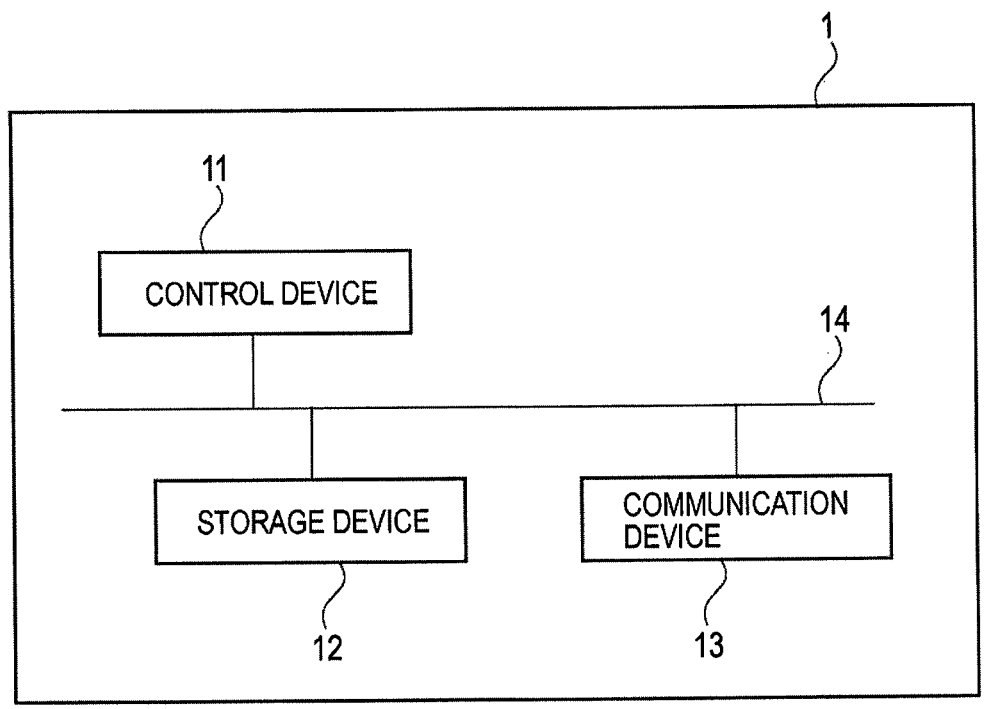
FIG. 14 is a diagram illustrating an example of a hardware structure of an information processing apparatus.

FIG. 14 is a diagram illustrating an example of a hardware structure of the information processing apparatus 1.

As illustrated in FIG. 14, the information processing apparatus 1 has, as a hardware structure, a structure in which a control device 11, a storage device 12, and a communication device 13 are connected via a bus 14. The control device 11 is a CPU or the like, and realizes functions of the information processing apparatus 1 by executing processing based on a program stored in the storage device 12 or the like. The storage device 12 is a storage device such as RAM, ROM, or HDD which stores a program as well as data and the like used by the control device 11 when executing processing based on the program. The communication device 13 is in charge of control of wired or wireless communication between the information processing apparatus 1 and the plural sensors 3 and control of wireless communication with the plural antennas 4. The following embodiments including this embodiment will be described assuming that the communication device 13 is in charge of control of wireless communication with the plural sensors 3 and the plural antennas 4. However, the information processing apparatus 1 may employ a structure having two communication devices, a communication device in charge of control of wireless communication between the information processing apparatus 1 and the plural sensors 3, and a communication device in charge of control of wireless communication between the information processing apparatus 1 and the plural antennas 4.

Figure 15:
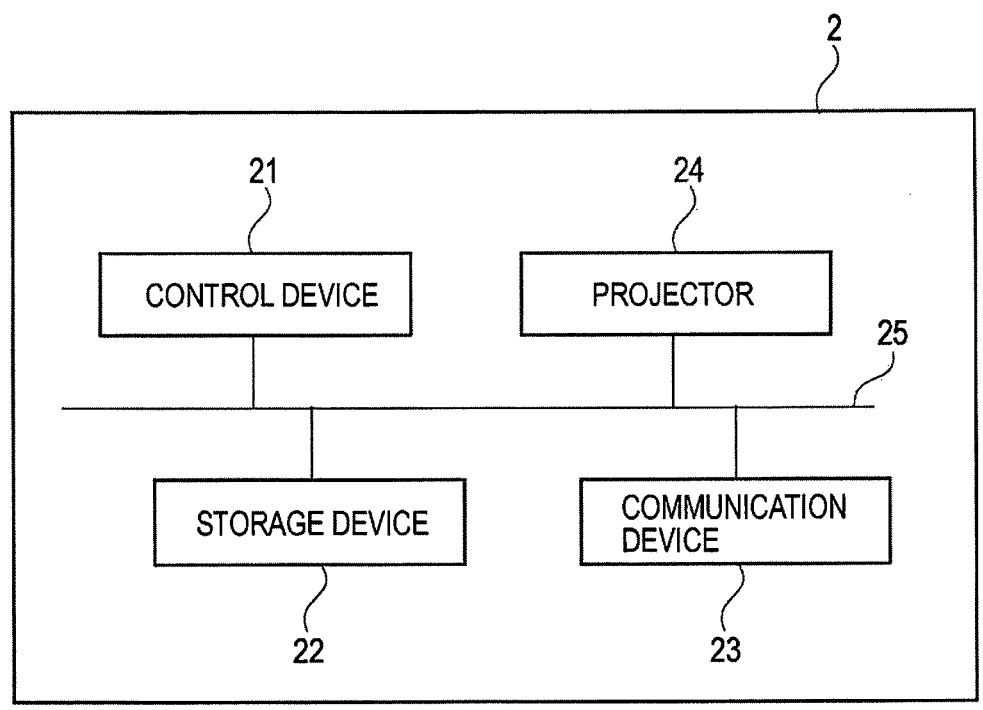
FIG. 15 is a diagram illustrating an example of a hardware structure of a car.

FIG. 15 is a diagram illustrating an example of a hardware structure of the car 2. Note that in FIG. 15, among hardware structures of the car, a hardware structure related to this embodiment is illustrated, and what are called hardware structures of the car such as an engine are omitted.

As illustrated in FIG. 15, the car 2 has, as a hardware structure, a structure in which a control device 21, a storage device 22, a communication device 23, and a projector 24 are connected via a bus 25. The control device 21 is a CPU or the like, and realizes functions related to this embodiment of the car 2 by executing processing based on a program stored in the storage device 22 or the like. The storage device 22 is a storage device such as RAM, ROM, or HDD which stores a program as well as data and the like used by the control device 21 when executing processing based on the program. The communication device 23 is in charge of control of wireless communication between the car 2 and the plural antennas 4. The projector 24 projects a virtual space image transmitted (or distributed) from the information processing apparatus 1 on a display of the car 2. This display is a system called Head-Up Display (HUD), on which an image projected from the projector 24 is reflected on the windshield or the like of the car and can be seen by the driver. Thus, the driver simultaneously sees a normal view seen from the driver's seat through the windshield, and a virtual space image projected by the projector 24 and reflected to be seen, which can be seen as an overlaid image.

Figure 16:
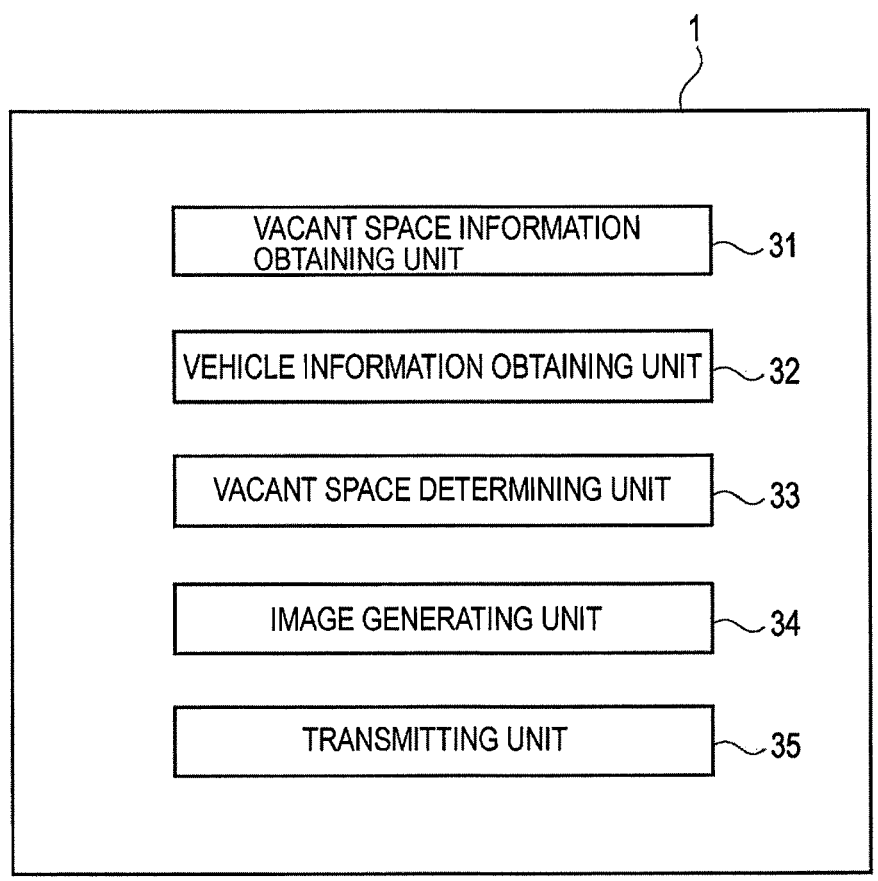
FIG. 16 is a diagram illustrating an example of a software structure of the information processing apparatus of Embodiment 3.

FIG. 16 is a diagram illustrating an example of a software structure of the information processing apparatus 1 of Embodiment 3. As illustrated in FIG. 16, the information processing apparatus 1 includes, as a software structure (functional structure), a vacant space information obtaining unit 31, a vehicle information obtaining unit 32, a vacant space determining unit 33, an image generating unit 34, and a transmitting unit 35.

The vacant space information obtaining unit 31 obtains vacant space information of the parking lot. More specifically, the vacant space information obtaining unit 31 receives vacant space information of the parking lot from the plural sensors 3 wirelessly or via wire. The vehicle information obtaining unit 32 obtains the position and the direction of the car in the parking lot. Describing more specifically, the vehicle information obtaining unit 32 receives an image of the car 2 imaged by a parking lot camera 5. Then, the vehicle information obtaining unit 32 determines location information on where this parking lot camera 5 is disposed by recognizing which parking lot camera 5 sent this image from the information correlating the parking lot cameras 5 and the location information on where the parking lot cameras 5 are disposed, which is stored in the storage device 12 or the like, and determines the location of the car 2 shown in the image. Further, the vehicle information obtaining unit 32 obtains the direction of the car 2 by analyzing the image.

The vacant space determining unit 33 determines a vacant space existing in the traveling direction of the car 2 based on the vacant space information obtained in the vacant space information obtaining unit 31, the position and direction of the car 2 obtained in the vehicle information obtaining unit 32, and the parking lot map which is map information in the parking lot stored in the storage device 12 or the like. More specifically, for example, a space ID or position information of the vacant space obtained from the vacant space information obtained from the vacant space information obtaining unit 31 is verified with the parking lot map, so as to determine the position information of the vacant space. Then, the vacant space determining unit 33 determines the vacant space existing in the traveling direction of the car 2 out of the position information of the determined one or more vacant spaces from the position and direction of the car 2 obtained in the vehicle information obtaining unit 32 and the route information of the parking lot map. The image generating unit 34 generates a virtual space image in the parking lot which includes a vacant space object indicating the vacant space and indicates the position of the vacant space, according to the position of the vacant space in the parking lot existing in the traveling direction of the car 2 which is determined in the vacant space determining unit 33. Here, the image generating unit 34 may determine the visual field of the driver from the car 2 based on the position and direction of the car 2 obtained in the vehicle information obtaining unit 32, and generate a virtual space image in the parking lot which includes a vacant space object indicating the vacant space and indicates the position of the vacant space, according to the position of the vacant space in the parking lot existing in the traveling direction of the car 2 in the visual field.

The transmitting unit 35 transmits the virtual space image generated in the image generating unit 34 to the car 2 via an antenna 4 near the position of the car 2.

Figure 17:
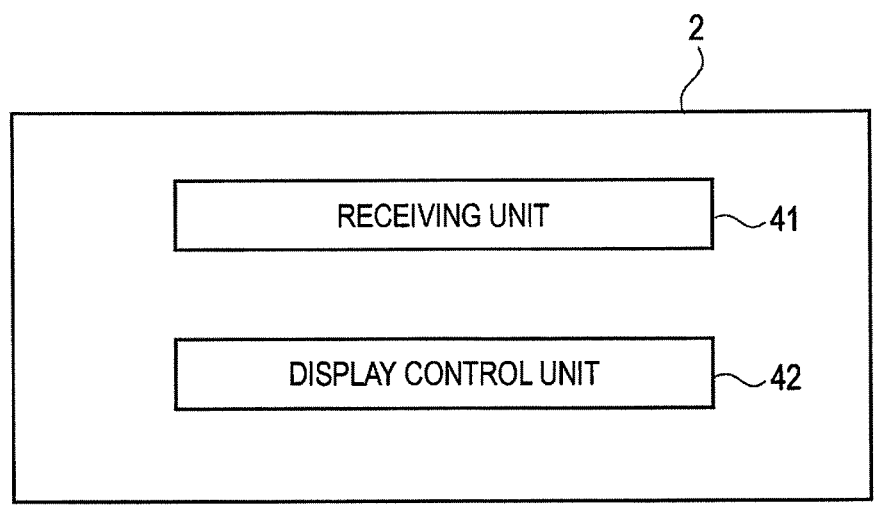
FIG. 17 is a diagram illustrating an example of a software structure of the car of Embodiment 3.

FIG. 17 is a diagram illustrating an example of a software structure of the car 2 of Embodiment 3. In FIG. 17, among software structures of the car, a software structure related to this embodiment is illustrated, and software structures related to control of an engine and so on of the car are omitted. As illustrated in FIG. 17, the car 2 includes, as a software structure (functional structure), a receiving unit 41 and a display control unit 42.

The receiving unit 41 receives a virtual space image from the information processing apparatus via the antenna 4. The display control unit 42 controls the projector 24 to project the virtual space image received in the receiving unit 41 on the display of the car, to thereby display the virtual space image in a manner overlaid on a view in the parking lot from the display.

Figure 18:
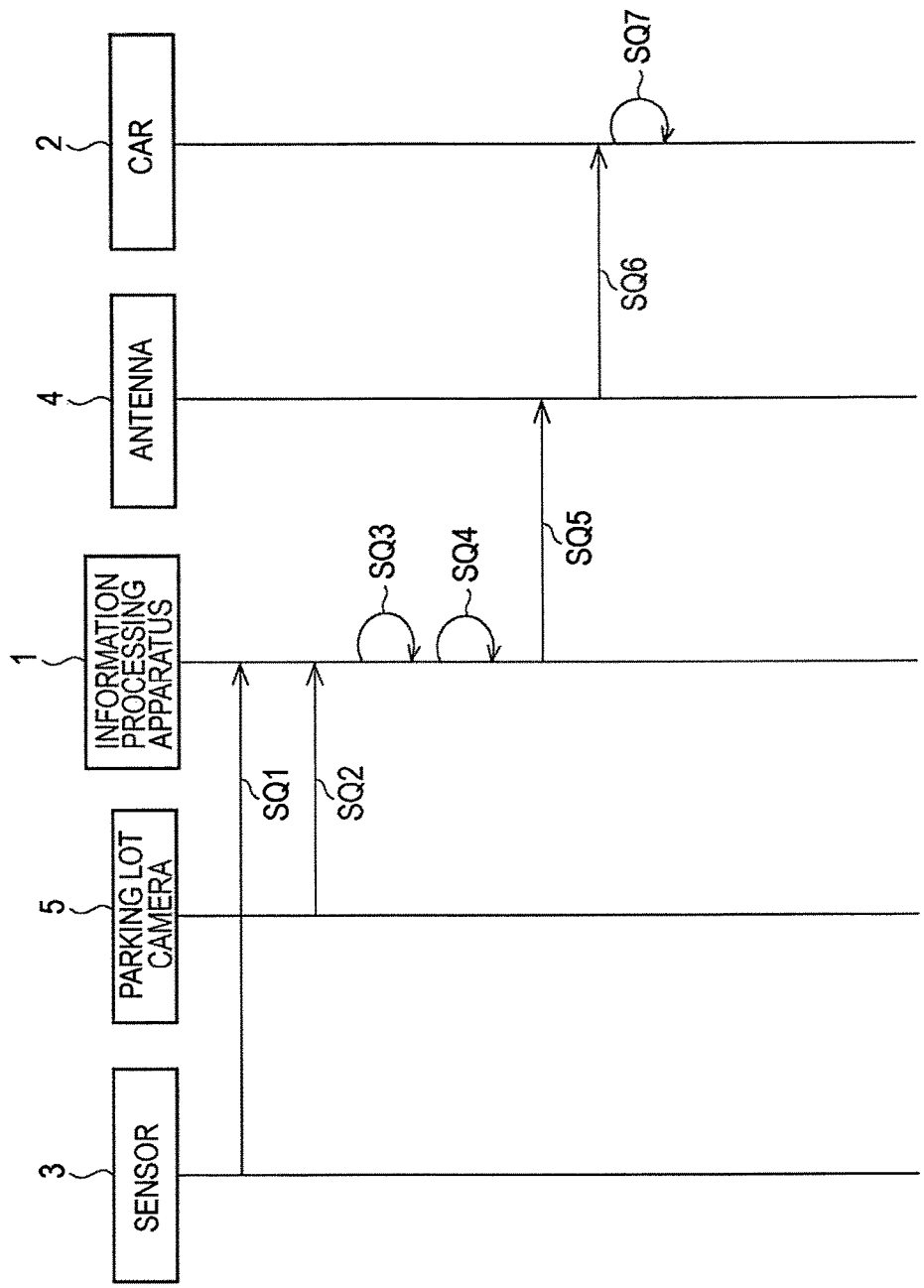
FIG. 18 is a sequence diagram illustrating an example of processing in the vacant space guidance system of Embodiment 3.

FIG. 18 is a sequence diagram illustrating an example of processing in the vacant space guidance system of Embodiment 3.

In sequence SQ1, the sensors 3 disposed respectively in spaces (car spaces) in the parking lot transmit, for example, information on whether a space is vacant or not to the information processing apparatus 1 at predetermined time intervals. The information processing apparatus 1 receives the information and comprehend and manage the vacant space information in the parking lot.

In sequence SQ2, the parking lot cameras 5 constantly transmit an imaged image wirelessly or via wire to the information processing apparatus 1. Note that the order of the sequence SQ1 and the sequence SQ2 is not in question. The order may be reverse of the order illustrated in FIG. 18, or may be simultaneous. The information processing apparatus 1 receives the image, and comprehend and manage the position and direction of the car in the parking lot.

In sequence SQ3, the information processing apparatus 1 determines a vacant space existing in the traveling direction of the car 2 based on the vacant space information and the position and direction of the car comprehended and managed, and the parking lot map stored in the storage device 12 or the like.

In sequence SQ4, the information processing apparatus 1 generates a virtual space image in the parking lot which includes a vacant space object indicating the vacant space and indicates the position of the vacant space, according to the position of the vacant space in the parking lot existing in the traveling direction of the car comprehended and managed.

In sequence SQ5 and sequence SQ6, the information processing apparatus 1 transmits the virtual space image to the car 2 via an antenna 4 near the position of the car.

In sequence SQ7, the car 2 performs control so that a virtual space image received from the information processing apparatus 1 is projected on the display of the car, to thereby display the virtual space image in a manner overlaid on a view in the parking lot from the display.

The processing illustrated in FIG. 18 is executed constantly or at predetermined intervals (for example, at 0.1-second intervals) until the car enters the parking lot and is parked in a parking space.

Figure 19:
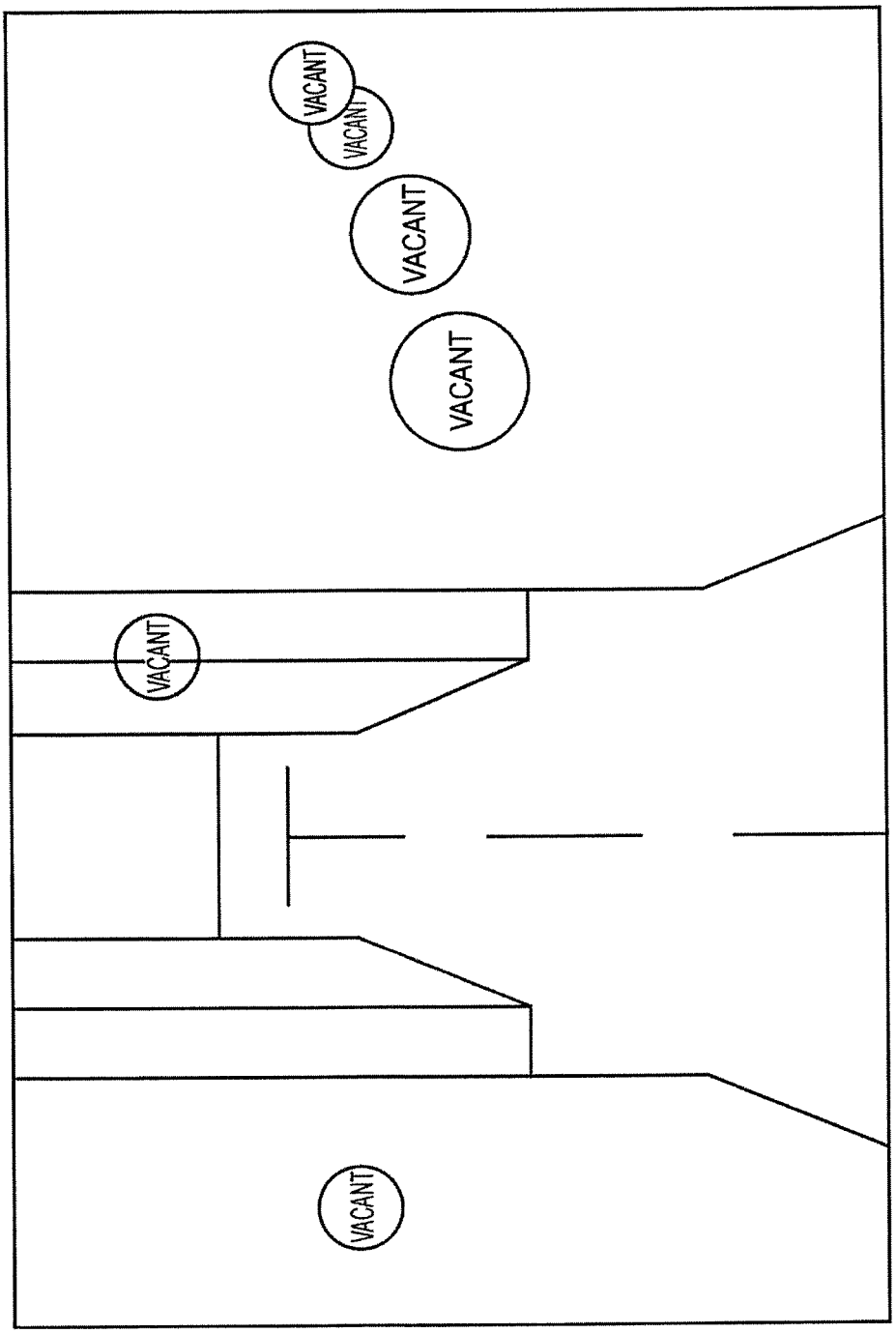
FIG. 19 is a diagram illustrating an example of overlay display on a display of Embodiment 3.

FIG. 19 is a diagram illustrating an example of overlay display on the display of Embodiment 3. As illustrated in FIG. 19, a virtual space image including a "vacant" object indicating a vacant space is displayed on the display in a manner overlaid on a view in the parking lot from the display. Here, when plural vacant spaces existing in the traveling direction of the car 2 are determined, the information processing apparatus 1 generates the virtual space image including vacant space objects with different shapes or colors according to distances from the car 2 to the respective vacant spaces. In the example of FIG. 19, the information processing apparatus 1 makes sizes of the vacant space objects different according to the distances. Describing more specifically, the information processing apparatus 1 generates a virtual space image in which a vacant space closer in distance to the car 2 is given a larger vacant space object among the plural determined vacant spaces. In this manner, the driver of the car 2 can intuitively recognize nearby vacant spaces.

Here, it is conceivable that when there are many vacant spaces, many "vacant" objects indicating a vacant space as illustrated in FIG. 19 are displayed on the display, and the visual field worsens for the driver of the car 2. Accordingly, for example, when the distance from a vacant space to the car 2 is more than or equal to a predetermined distance, the information processing apparatus 1 generates a virtual space image which includes a vacant space ratio object representing by a color or the like for example the ratio of a vacant space to the space inside a block in each of plural blocks dividing the parking lot, and indicates the position of the block. On the other hand, when the distance is less than the predetermined distance, the information processing apparatus 1 may generate a virtual space image which includes a vacant space object representing a vacant space existing in the traveling direction of the car 2 and indicates the position of the vacant space. In such a structure, when the car 2 is located away from vacant spaces, an object distinguished by a different color and indicating the vacant space ratio in each block is displayed on the display. Then, when the car 2 gets close to the vacant spaces, vacant space objects each indicating one vacant space as illustrated in FIG. 19 are spread and displayed.

As described above, according to this embodiment, it is possible to provide a technology allowing the driver to find and reach a target vacant space without updating the map information of the car navigation system mounted in each car or even when no car navigation system is mounted in each car.

Embodiment 4

Hereinafter, Embodiment 4 will be described. In Embodiment 4, differences from Embodiment 3 will be described.

Figure 20:
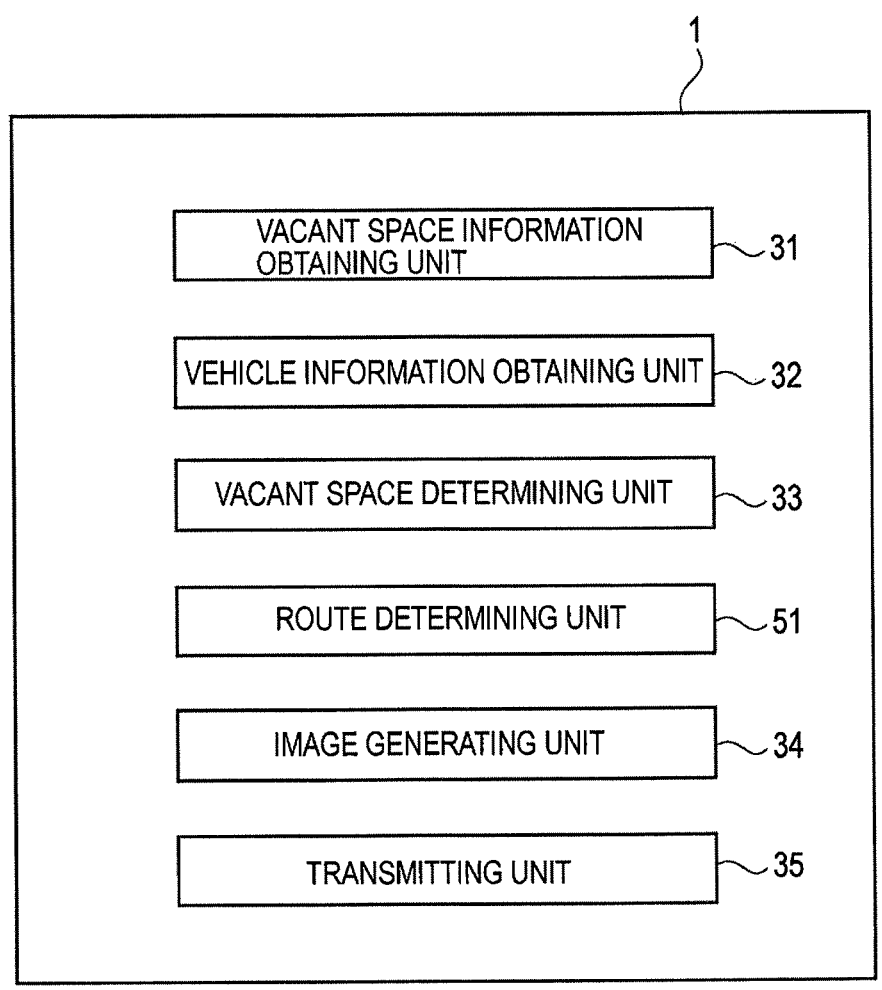
FIG. 20 is a diagram illustrating an example of a software structure of an information processing apparatus of Embodiment 4.

FIG. 20 is a diagram illustrating an example of a software structure of an information processing apparatus 1 of Embodiment 4. As illustrated in FIG. 20, the software structure of the information processing apparatus 1 of Embodiment 4 further includes a route determining unit 51 as compared to the software structure of the information processing apparatus 1 of Embodiment 3. Based on a vacant space determined in the vacant space determining unit 33, the position and direction of the car in the parking lot obtained in the vehicle information obtaining unit 32, and the parking lot map stored in the storage device 12, the route determining unit 51 determines a route from the car to the vacant space. The image generating unit 34 of this embodiment generates the virtual space image which includes a vacant space object indicating the vacant space, indicates the position of the vacant space, and includes a guidance object indicating the route determined in the route determining unit 51, according to the position of the vacant space in the parking lot existing in the traveling direction of the car 2 which is determined in the vacant space determining unit 33.

Further, for example, when plural vacant spaces existing in the traveling direction of the car are determined in the vacant space determining unit 33, the route determining unit 51 determines a route from the car to the vacant space which is closest to the car among the plural vacant spaces.

Figure 21:
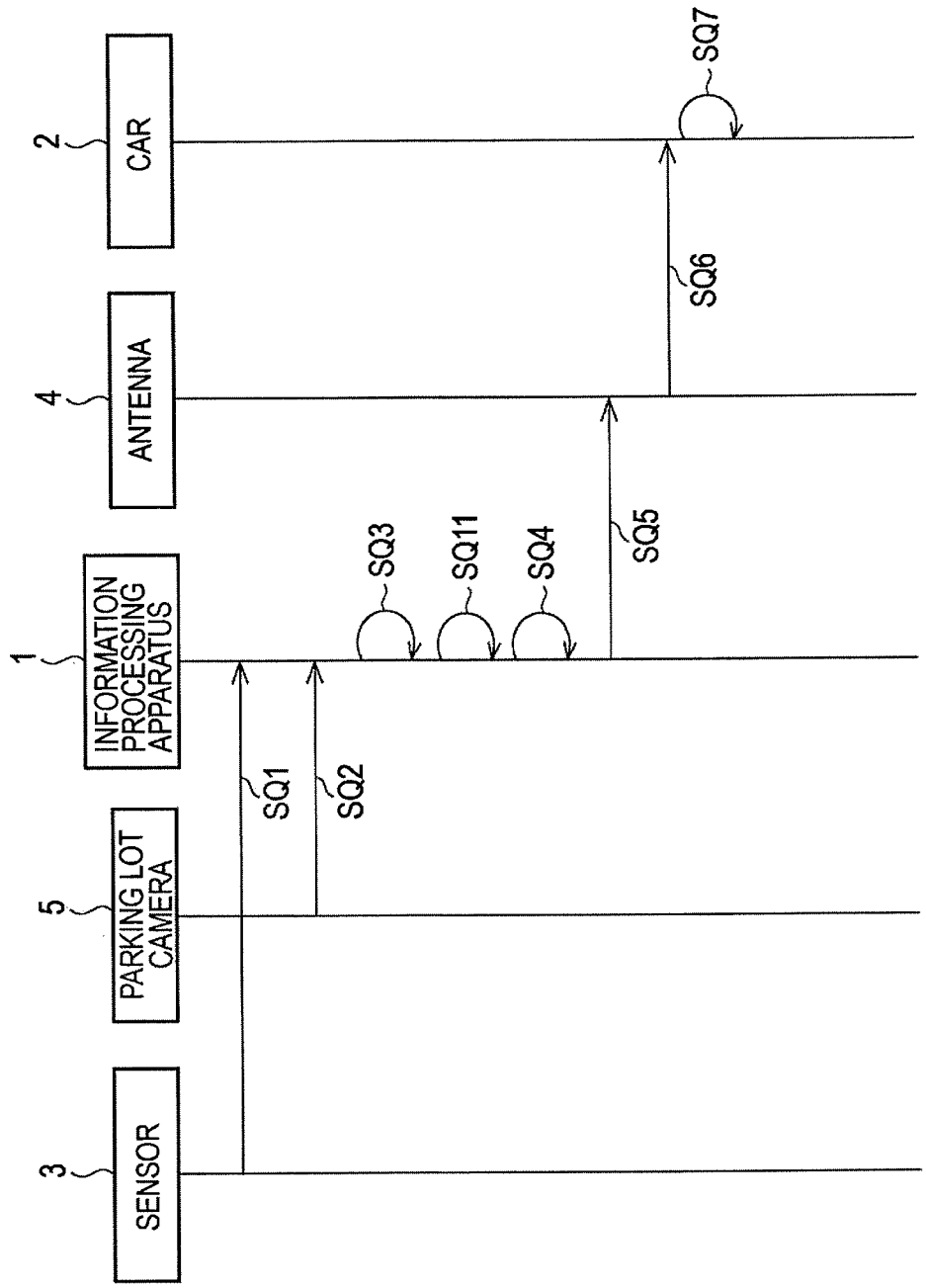
FIG. 21 is a sequence diagram illustrating an example of processing in a vacant space guidance system of Embodiment 4.

FIG. 21 is a sequence diagram illustrating an example of processing in a vacant space guidance system of Embodiment 4.

In the sequence diagram of Embodiment 4 illustrated in FIG. 21, sequence SQ11 is newly added as compared to the sequence diagram of Embodiment 3 illustrated in FIG. 18.

In the sequence SQ11, the information processing apparatus 1 determines a route from the car to the vacant space determined in the sequence SQ3 based on the vacant space information and the position and direction of the car comprehended and managed, and the parking lot map stored in the storage device 12 or the like.

In the sequence SQ4, the information processing apparatus 1 generates the virtual space image which includes a vacant space object indicating the vacant space, indicates the position of the vacant space, and includes a guidance object indicating the determined route, according to the position of the vacant space in the parking lot existing in the traveling direction of the car comprehended and managed.

Figure 22:
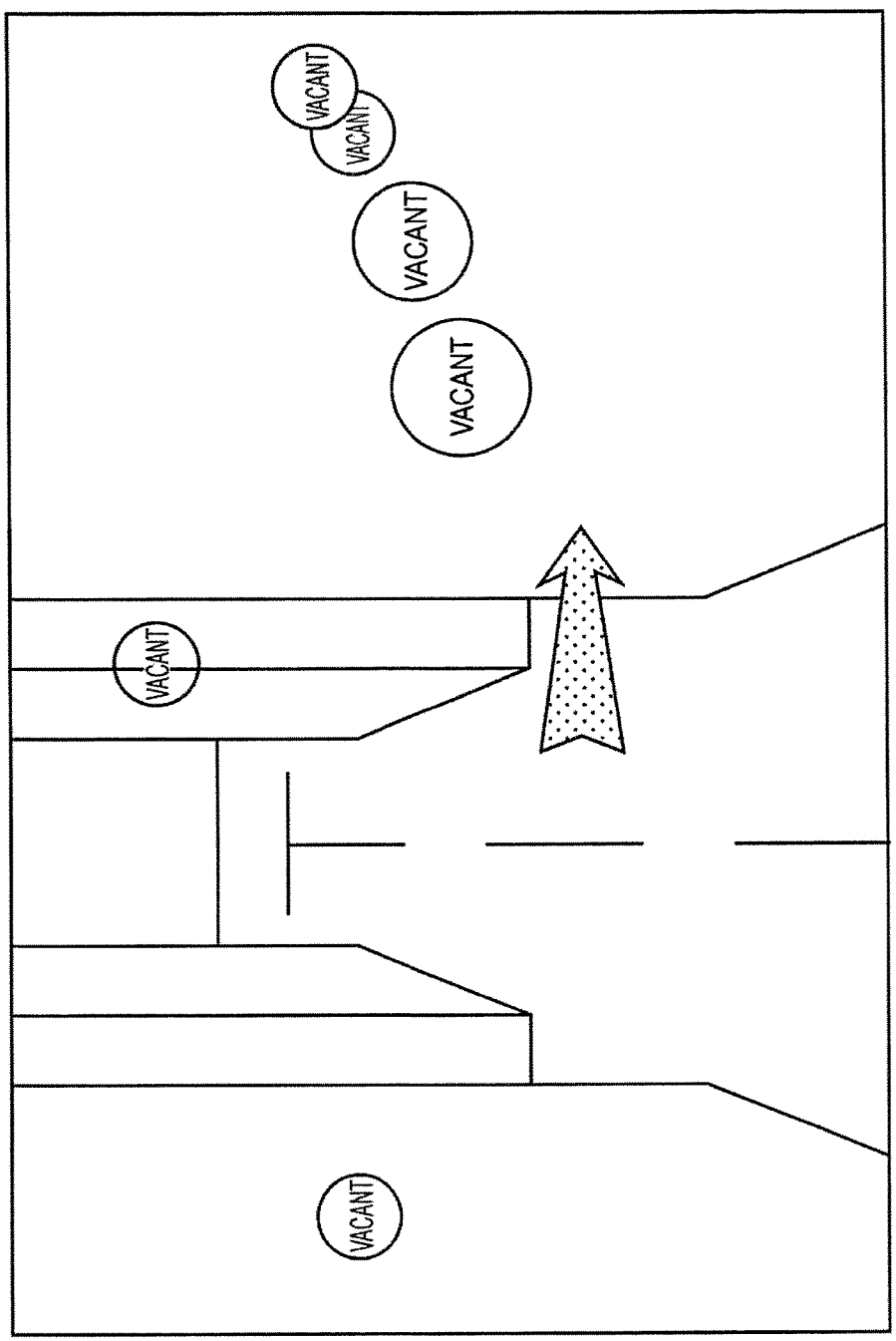
FIG. 22 is a diagram illustrating an example of overlay display on a display of Embodiment 4.

FIG. 22 is a diagram illustrating an example of overlay display on the display of Embodiment 4. In the overlay display of Embodiment 4 illustrated in FIG. 22, as compared to the overlay display of Embodiment 3 illustrated in FIG. 19, an arrow object is added as an example of the guidance object indicating a route to a vacant space close to the car.

As described above, according to this embodiment, it is possible to provide a technology allowing the driver to find and reach a target vacant space more quickly without updating the map information of the car navigation system mounted in each car or even when no car navigation system is mounted in each car.

Embodiment 5

Hereinafter, Embodiment 5 will be described. In Embodiment 5, differences from above-described embodiments will be described.

Figure 23:
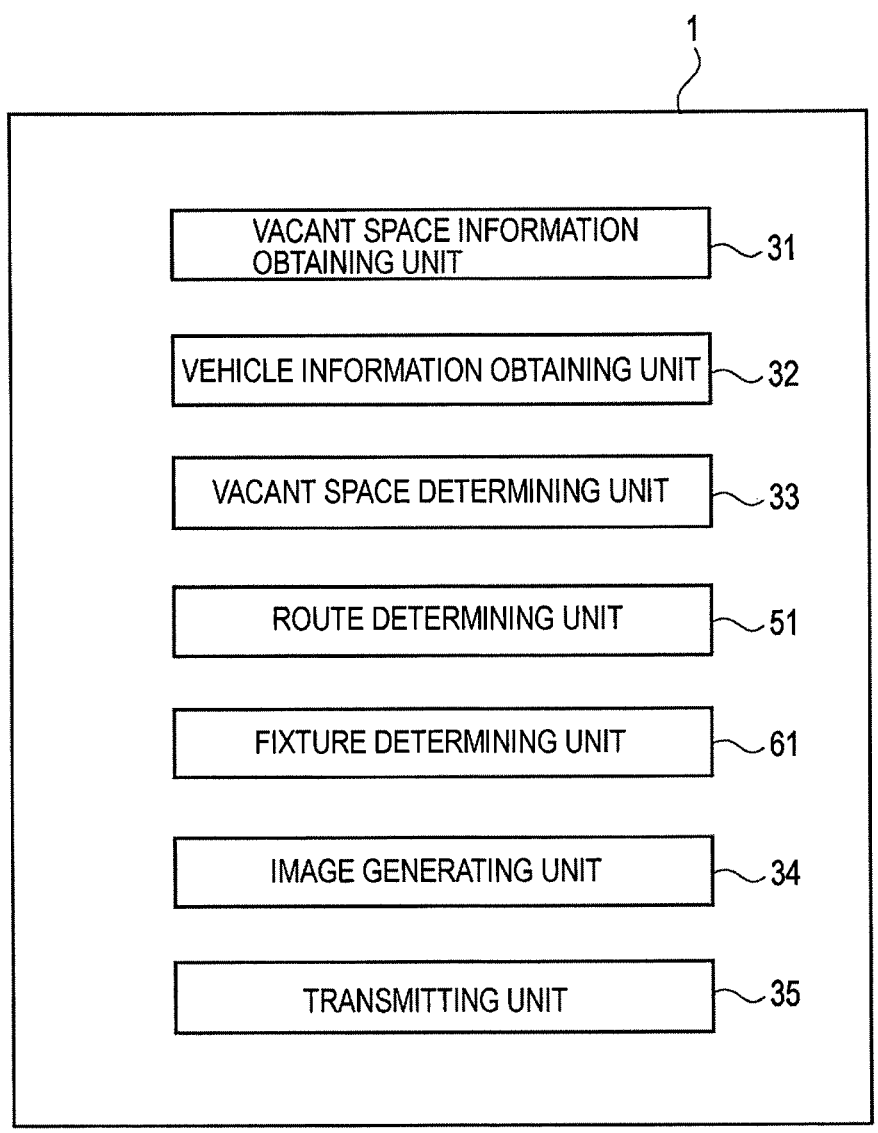
FIG. 23 is a diagram illustrating an example of a software structure of an information processing apparatus of Embodiment 5.

FIG. 23 is a diagram illustrating an example of a software structure of an information processing apparatus 1 of Embodiment 5. As illustrated in FIG. 23, the software structure of the information processing apparatus 1 of Embodiment 5 further includes a fixture determining unit 61 as compared to the software structure of the information processing apparatus 1 of Embodiment 4. Further, in the parking lot map, in addition to the above-described information, fixtures in the parking lot (for example, an entrance of a shop, a restroom, an emergency exit, and so on) and position information and so on related to locations of the fixtures are managed. The fixture determining unit 61 determines a fixture (for example, an entrance of a shop, a restroom, an emergency exit, and so on) existing in the traveling direction of the car based on the position and direction of the car in the parking lot obtained in the vehicle information obtaining unit 32 and the parking lot map stored in the storage device 12. The image generating unit 34 of this embodiment generates a virtual space image which includes a vacant space object indicating the vacant space, a guidance object indicating the route determined in the route determining unit 51, and a fixture object indicating the fixture existing in the traveling direction of the car 2 determined in the fixture determining unit 61, and indicates the position of the vacant space and the position of the fixture, according to the positions of the vacant space and the fixture in the parking lot existing in the traveling direction of the car 2 determined in the vacant space determining unit 33.

Figure 24:
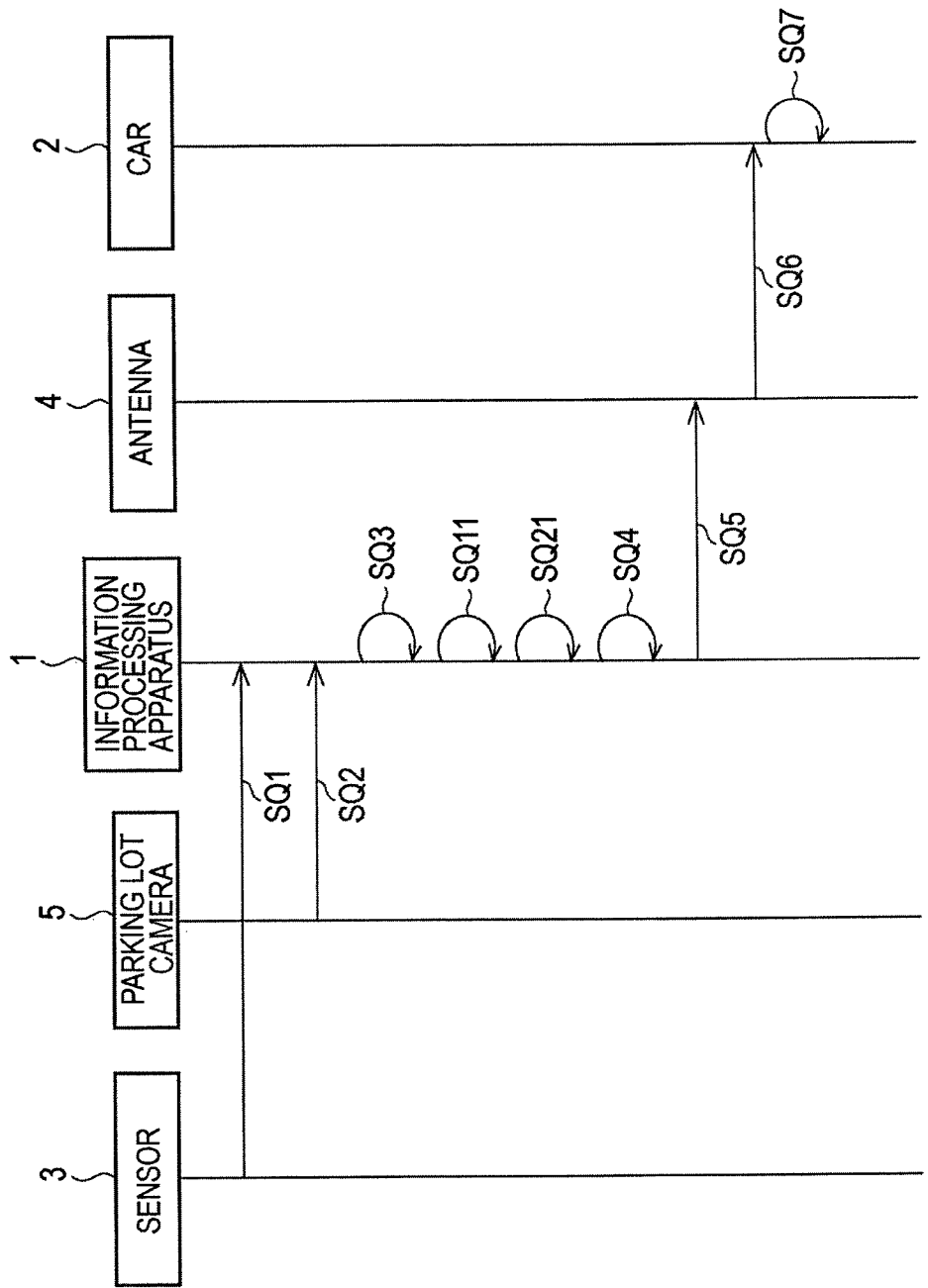
FIG. 24 is a sequence diagram illustrating an example of processing in a vacant space guidance system of Embodiment 5.

FIG. 24 is a sequence diagram illustrating an example of processing in a vacant space guidance system of Embodiment 5.

In the sequence diagram of Embodiment 5 illustrated in FIG. 24, sequence SQ21 is newly added as compared to the sequence diagram of Embodiment 4 illustrated in FIG. 21.

In the sequence SQ21, the information processing apparatus 1 determines a fixture of the parking lot existing in the traveling direction of the car based on the position and direction comprehended and managed and the parking lot map stored in the storage device 12 or the like. Note that the order of the sequence SQ11 and the sequence SQ21 is not in question. The order may be reverse of the order illustrated in FIG. 24, or may be simultaneous.

In the sequence SQ4, the information processing apparatus 1 generates the virtual space image which includes the vacant space object, the guidance object, and the fixture object, and indicates the position of the vacant space and the position of the fixture, according to the positions of the vacant space and the fixture in the parking lot existing in the traveling direction of the car comprehended and managed.

Figure 25:
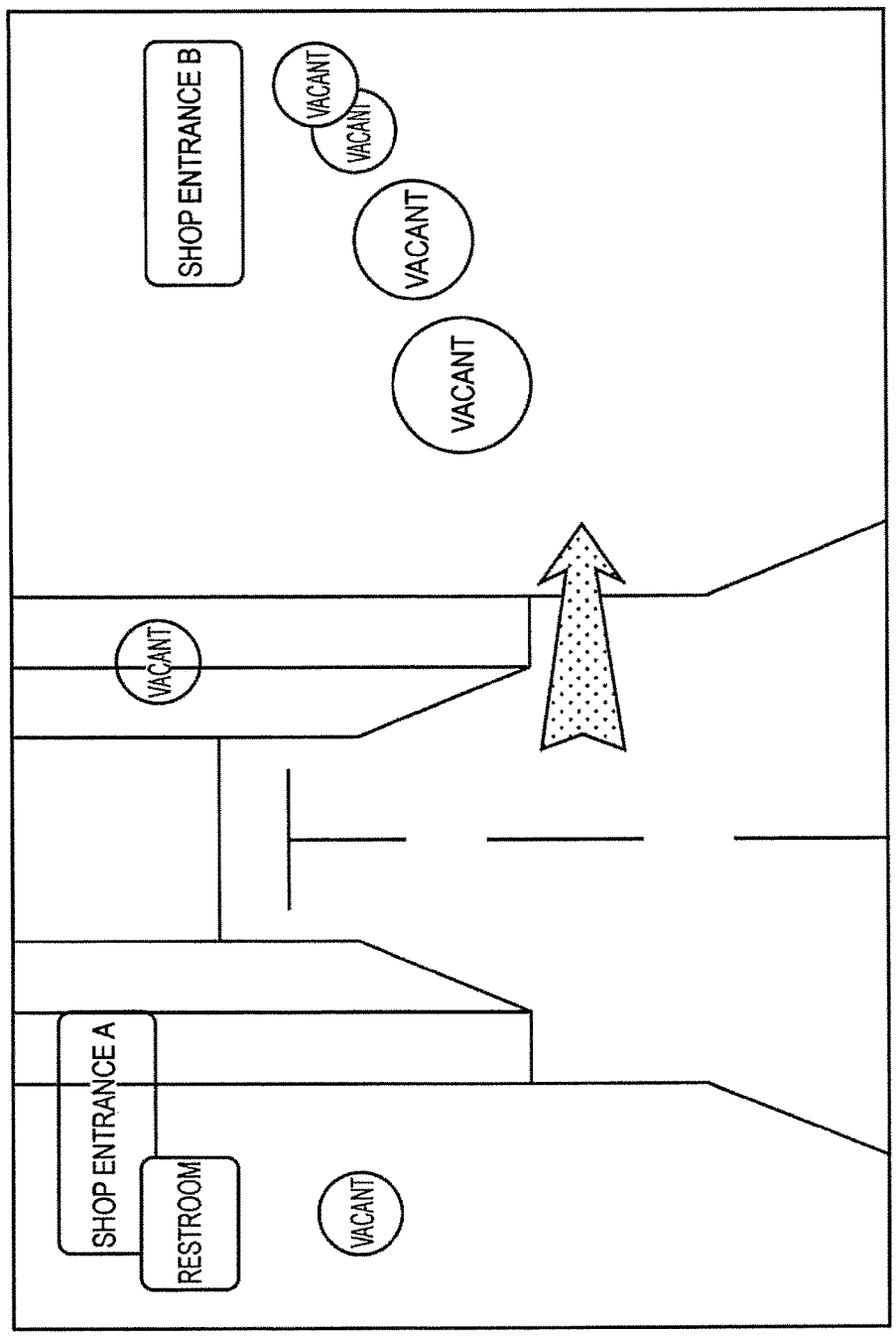
FIG. 25 is a diagram illustrating an example of overlay display on a display of Embodiment 5.

FIG. 25 is a diagram illustrating an example of overlay display on the display of Embodiment 5. In the overlay display of Embodiment 5 illustrated in FIG. 25, as compared to the overlay display of Embodiment 4 illustrated in FIG.

22, an object indicating an entrance of a shop and an object indicating a restroom are added as examples of the fixture object.

As described above, according to this embodiment, it is possible to provide a technology allowing the driver to find and reach a target vacant space more appropriately without updating the map information of the car navigation system mounted in each car or even when no car navigation system is mounted in each car. For example, the driver can park in a parking space near the entrance of the shop.

Embodiment 6

Hereinafter, Embodiment 6 will be described. In Embodiment 6, differences from the above-described embodiments will be described.

Figure 26:
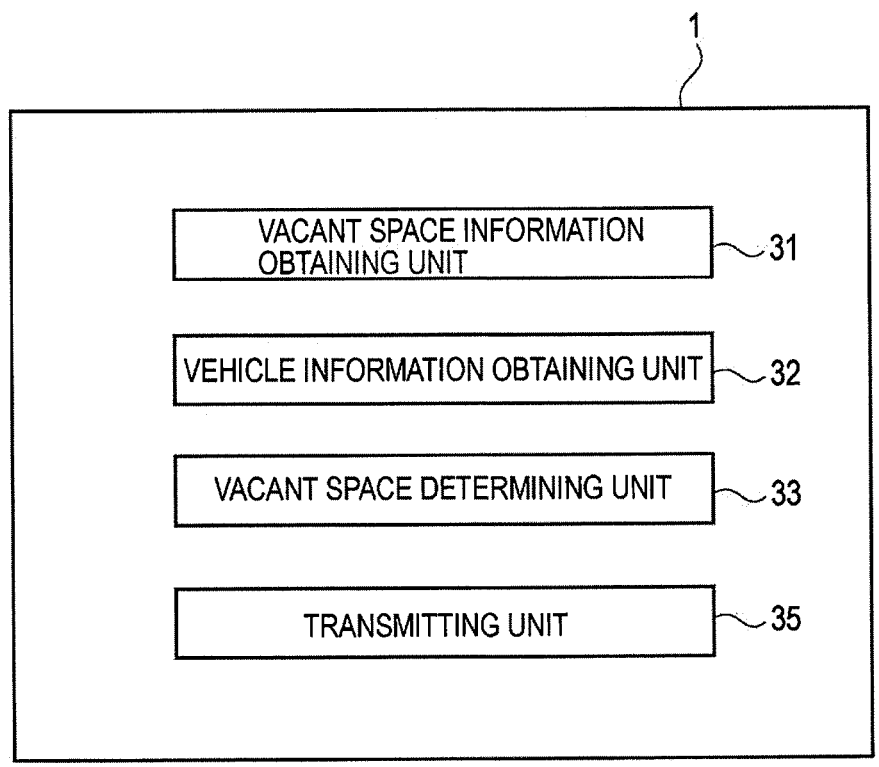
FIG. 26 is a diagram illustrating an example of a software structure of an information processing apparatus of Embodiment 6.
Figure 27:
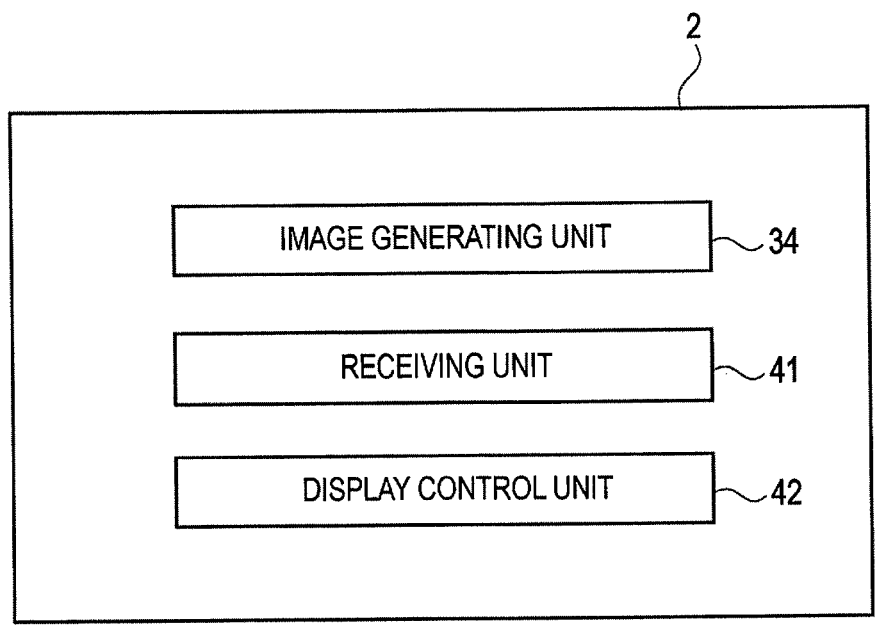
FIG. 27 is a diagram illustrating an example of a software structure of a car of Embodiment 6.

FIG. 26 is a diagram illustrating an example of a software structure of an information processing apparatus 1 of Embodiment 6. Further, FIG. 27 is a diagram illustrating an example of a software structure of a car 2 of Embodiment 6. The software structure of the information processing apparatus 1 of Embodiment 6 does not include the image generating unit 34 as compared to the software structure of the information processing apparatus 1 of Embodiment 3. Instead, the software structure of the car 2 of Embodiment 6 newly includes an image generating unit 34 as compared to the software structure of the car 2 of Embodiment 3. In the structure of this embodiment, the information processing apparatus 1 transmits a vacant space object and so on to the car 2. The car 2 performs control to generate an image including the received vacant space object and so on and project the image on a display or the like.

The transmitting unit 35 of this embodiment transmits a vacant space object indicating a vacant space determined in the vacant space determining unit 33 and position information representing the position of the vacant space to the car 2. Then, the receiving unit 41 of this embodiment receives the vacant space object and the position information from the information processing apparatus 1. Then, the image generating unit 34 of this embodiment generates a virtual space image in the parking lot in which the vacant space object received in the receiving unit 41 is displayed at the position indicated by the position information received in the receiving unit 41. Then, the display control unit 42 of this embodiment performs control to project the virtual space image generated in the image generating unit 34 on the display of the car, to thereby display the virtual space image in a manner overlaid on a view in the parking lot from the display.

Figure 28:
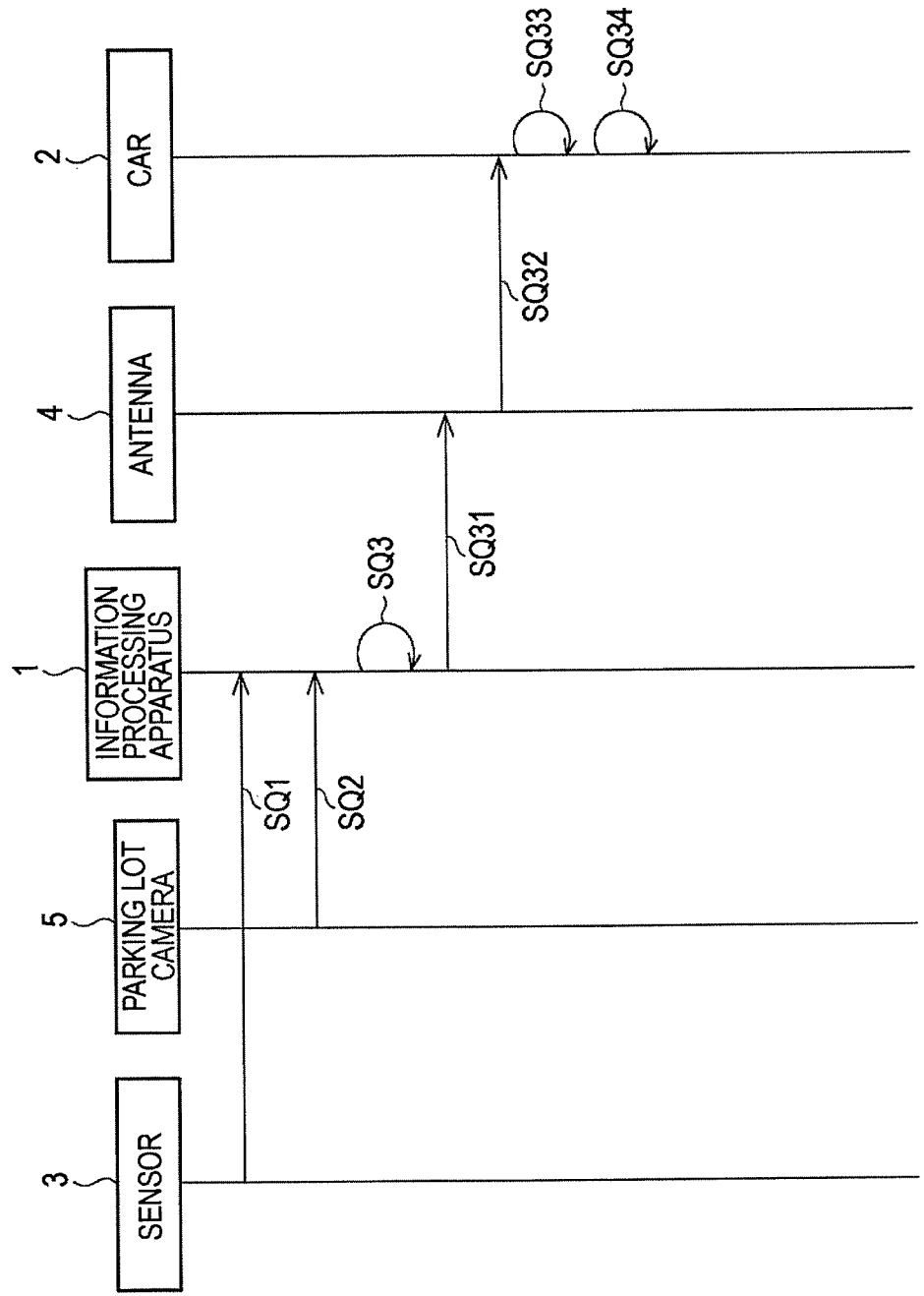
FIG. 28 is a sequence diagram illustrating an example of processing in a vacant space guidance system of Embodiment 6.

FIG. 28 is a sequence diagram illustrating an example of processing in a vacant space guidance system of Embodiment 6.

Processing from sequence SQ1 to sequence SQ3 of Embodiment 6 illustrated in FIG. 28 is similar to the processing from the sequence SQ1 to the sequence SQ3 of FIG. 18, and thus description thereof is omitted.

In sequence SQ31 and sequence SQ32, according to the position in the parking lot of a vacant space existing in the traveling direction of the car comprehended and managed, the information processing apparatus 1 transmits a vacant space object indicating the vacant space and position information of the vacant space to the car 2 via an antenna 4 close to the position of the car.

In sequence SQ33, the car 2 generates a virtual space image in the parking lot in which the vacant space object received from the information processing apparatus 1 is displayed at the position indicated by the position information.

In sequence SQ34, the car 2 performs control to project the generated virtual space image on the display of the car, to thereby display the virtual space image in a manner overlaid on a view in the parking lot from the display.

In the structure as in this embodiment, it is possible to provide a technology allowing the driver to find and reach a target vacant space without updating the map information of the car navigation system mounted in each car or even when no car navigation system is mounted in each car.

Other Embodiments

Hereinafter, other embodiments will be described.

When there exist plural cars in the parking lot, the information processing apparatus 1 may be configured to predict a parking status after a predetermined time (for example, after one minute) based on contents of guidance to a certain car (for example, information related to a route to a vacant space, or the like), and change a destination of guidance to a vacant space for another car.

Further, when there exists a vehicle not complying with guidance based on images from the parking lot cameras 5 and the like, the information processing apparatus 1 may be configured to switch the guidance to a next-best destination of guidance. Note that at this time, the information processing apparatus 1 may be configured to change the prediction of parking status.

Further, when a blind corner or the like exists in the parking lot cameras 5, the information processing apparatus 1 may be configured to predict the parking status and compensate the blind corner based on entrance information, exit information, and/or guidance histories or the like of the parking lot.

Further, the information processing apparatus 1 may be configured to determine the size (height, light car, large car) and so on of a car based on the image of the car (for example, a number plate or the like) imaged at the entrance and verify them with information related to standards of the vacant space managed in the parking lot map, and determine vacant space information corresponding to the size of the vehicle.

Further, in the above-described embodiments, the information processing apparatus 1 determines the position and direction of the car based on images from the parking lot cameras 5 or the like. However, the information processing apparatus 1 may be configured to determine the position and movement (direction) of the car from wireless communication between the antenna 4, which is an example of wireless access point, and the car 2. Further, when the car 2 is equipped with a camera, the information processing apparatus 1 may be configured to receive an image imaged by the camera of the car 2 via wireless communication or the like, and determine the position and direction of the car based on the image. Further, when the car 2 has a GPS compass (or GPS receiver) obtaining position information of the car (longitude, latitude) or a gyro compass obtaining the direction of the car, the information processing apparatus 1 may be configured to obtain the position information and direction of the car from the car 2 via wireless communication to determine them. Further, the information processing apparatus 1 may be configured to determine the position and direction of the car by combining these plural methods.

Further, although the information processing apparatus 1 is described to perform wireless communication with the car 2 via the antennas 4 in the above-described embodiments, the information processing apparatus 1 may be configured to perform wireless communication directly with the car 2 without intervention of the antennas 4.

Further, the car 2 may be configured to transmit speed information of itself to the information processing apparatus 1. In such a structure, the information processing apparatus 1 determines a vacant space existing in the traveling direction of the car 2 according to the speed information of the car 2. Note that the information processing apparatus 1 may be configured to obtain the speed information of the car 2 based on images of the car 2 from the parking lot cameras 5.

Further, when the car 2 has an imaging device such as a camera, the car 2 may be configured to overlay an image in the parking lot imaged by the imaging device and a virtual space image received from the information processing apparatus 1 and display the overlaid images on the display or the like, or display the image and the virtual space image on a display device of a car navigation system (that is, a non-transmissive display or the like).

Further, for example, in the above-described embodiments, the projector 24 of HUD type is described as an example, but it may be a transmissive display. For example, it may be a human body wearable type such as a Head Mounted Display, or a non-human body wearable type such as a windshield on which a transmissive liquid crystal film is attached. For example, the car 2 displays the virtual space image on the transmissive liquid crystal film, allowing seeing the virtual space image and a view in the parking lot from the windshield of the car as overlaid images.

Note that alignment of the virtual space image and the view in the parking lot may be performed in the information processing apparatus 1 or in the car 2.

Note that the above-described embodiments may be combined arbitrarily and implemented.

Note that the above-described information processing apparatus 1 is an example of a computer.

Embodiment 7

Hereinafter, Embodiment 7 will be described.

Figure 29:
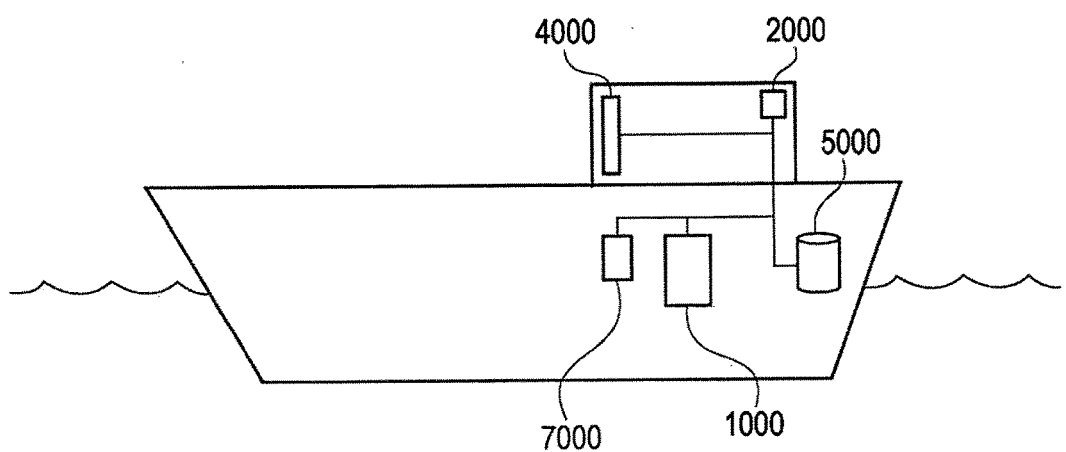
FIG. 29 is a diagram illustrating an example of a system structure of an image display system of Embodiment 7.

FIG. 29 is a diagram illustrating an example of a system structure of an image display system of Embodiment 7. As illustrated in FIG. 29, in the image display system of Embodiment 7, a GPS compass (or GPS receiver) 2000 obtaining position information of a ship, an information storage device 5000 storing an electronic marine chart including seafloor shapes and a tide table, an image display device 4000, an image providing device 1000 providing an image to the image display device 4000, a gyro compass 7000 obtaining the direction of the ship, and a cruise control device 6000 controlling cruising of the ship are connected via a network.

The GPS compass (or GPS receiver) 2000 as an example of a position information obtaining device obtains position information (longitude, latitude) of the ship. Note that an example of the position information obtaining device may be a GPS compass or a GPS receiver, but for simplicity of description, the GPS compass is described below for example.

The gyro compass 7000 as an example of a direction obtaining device obtains the direction of a ship.

The image providing device 1000 obtains the depth below sea level at the position of the ship based on position information of the ship obtained in the GPS compass 2000 and the tide table and the electronic marine chart stored in the information storage device 5000. Note that the tide table shows data representing times and heights of the sea level measured with reference to a hydrographic datum or the like in correlation in certain position information, and is published by the Japan Coast Guard or the like. Further, the electronic marine chart is, for example, computerized map data of the sea published by the Japan Coast Guard or the like, and is categorized in various types depending on purposes, such as nautical charts, special charts, basic maps of the sea, topographic maps of coastal areas, land condition maps of coastal areas, marine geology maps, and so on. The electronic marine chart describes, for example, information related to depths measured with reference to a hydrographic datum or the like, statuses of channels, ocean currents and tidal currents, signs, coastal conditions, and so on, and for example, the basic maps of the sea include bathymetric charts representing seafloor topographies with depth contours, three-dimensional overhead view maps of the seafloor topographies, and so on. The image providing device 1000 may obtain the depth by calculation based on the position information, the tide table, and the information related to depths indicated on the electronic marine chart, or may obtain the depth from a table or the like in which the position information, the tide table, and the information related to depths indicated on the electronic marine chart are managed. Further, the image providing device 1000 creates a virtual space image of a seafloor shape below sea level at the depth at the position of the ship based on the position information, the obtained depth below sea level, and the electronic marine chart stored in the information storage device 5000, and provides the virtual space image to the image display device 4000. For example, three-dimensional overhead view maps illustrating seafloor topographies are stored in the information storage device 5000, and a three-dimensional map of a seafloor topography at the relevant position and depth is extracted from marine charts of the three-dimensional overhead view maps or calculated based on the position information and the obtained depth below sea level, so as to create the virtual space image of the seafloor shape below sea level at the depth at the position of the ship. Note that the image providing device 1000 performs coordinate conversion of the image into an image of the view point from a windshield or the like of the ship, which will be described later, and provides the converted image to the image display device 4000. The image providing device 1000 is also an example of a computer.

The image display device 4000 is, as will be described later, a display device of transmissive liquid crystal film or the like attached to a windshield or the like of the ship, and displays the virtual space image of the seafloor shape provided from the image providing device 1000 in an overlaid manner below sea level on a view from the windshield or the like.

Note that besides the above-described information, the information storage device 5000 stores own ship information obtained from a predetermined device or the like or calculated based on predetermined information as disclosed in the above-described prior art literatures. As examples of the own ship information, there are stored position information, movement information including a course, speed, and so on, draft information, cargo information, number of passengers, time information, and so on.

Figure 30:
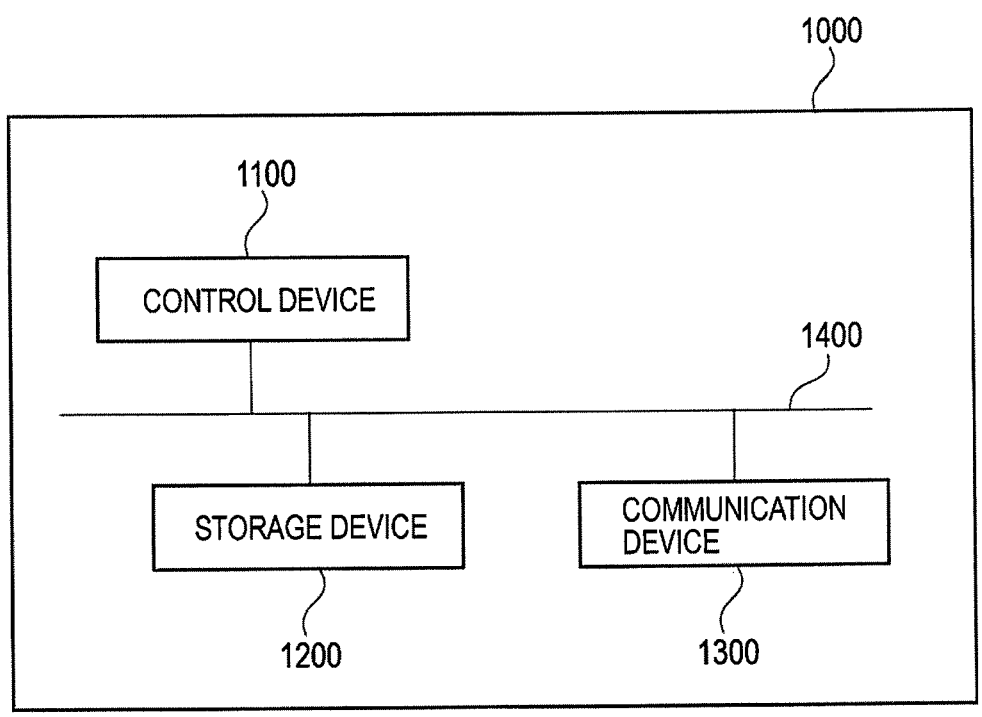
FIG. 30 is a diagram illustrating an example of a hardware structure of an image providing device.

FIG. 30 is a diagram illustrating an example of a hardware structure of the image providing device 1000.

As illustrated in FIG. 30, the image providing device 1000 has, as a hardware structure, a structure in which a control device 1100, a storage device 1200, and a communication device 1300 are connected via a bus 1400. The control device 1100 is a CPU or the like, and realizes functions of the image providing device 1000 by executing processing based on a program stored in the storage device 1200 or the like. The storage device 1200 is a storage device such as RAM, ROM, or HDD which stores a program as well as data and the like used by the control device 1100 when executing processing based on the program. The communication device 1300 is in charge of control of communication between the image providing device 1000 and other devices in the image display system.

Figure 31:
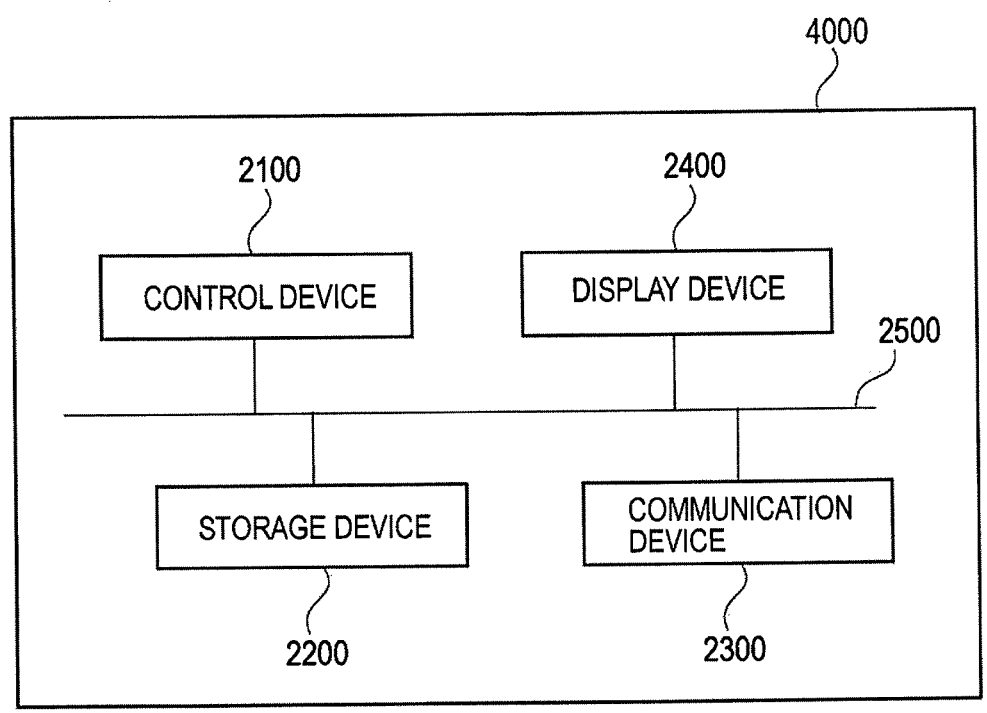
FIG. 31 is a diagram illustrating an example of a hardware structure of an image display device.

FIG. 31 is a diagram illustrating an example of a hardware structure of the image display device 4000.

As illustrated in FIG. 31, the image display device 4000 has, as a hardware structure, a structure in which a control device 2100, a storage device 2200, a communication device 2300, and a display device 2400 are connected via a bus 2500. The control device 2100 is a CPU or the like, and realizes functions of the image display device 4000 by executing processing based on a program stored in the storage device 2200 or the like. The storage device 2200 is a storage device such as RAM, ROM, or HDD which stores a program as well as data and the like used by the control device 2100 when executing processing based on the program. The communication device 2300 is in charge of control of communication between the image display device 4000 and other devices in the image display system. The display device 2400 is a transmissive liquid crystal film or the like attached on a windshield or the like of the ship, and displays an image and so on provided by the image providing device 1000 under control of the control device 2100.

Figure 32:
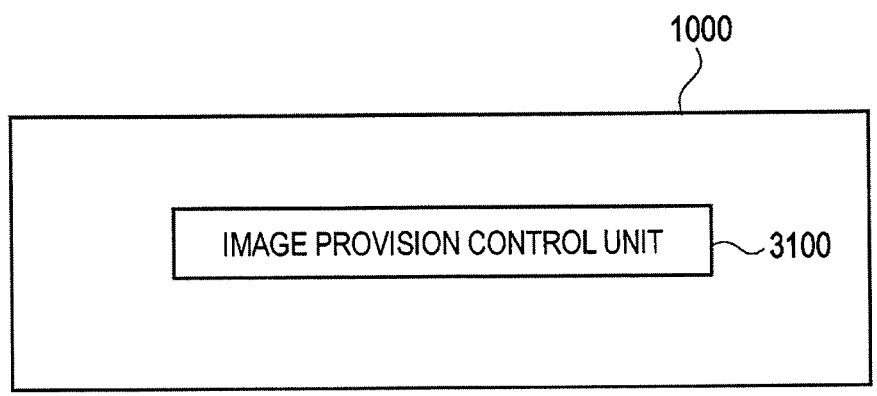
FIG. 32 is a diagram illustrating an example of a software structure of an image providing device.

FIG. 32 is a diagram illustrating an example of a software structure of the image providing device 1000.

As illustrated in FIG. 32, the image providing device 1000 includes an image provision control unit 3100 as a software structure (functional structure). The image provision control unit 3100 obtains the depth below sea level at the position of the ship based on the position information of the ship obtained in the GPS compass 2000, and the tide table and the electronic marine chart stored in the information storage device 5000. Generally, for example, information related to a depth measured with reference to a hydrographic datum or the like on the electronic marine chart is compensated with information related to the tide level at the relevant time and position managed in the tide table, so as to obtain the depth below sea level at the position of the ship. Then, the image provision control unit 3100 extracts seafloor topography image data at the position information and depth from the bathymetric charts of the electronic marine chart based on the position information, the obtained depth below sea level, and the electronic marine chart stored in the information storage device 5000 so as to create a virtual space image of the seafloor shape below sea level at the depth at the position of the ship, and provides the virtual space image to the image display device 4000. Note that the image provision control unit 3100 performs coordinate conversion of the image into an image of the view point from a windshield of the ship which will be described later, and provides the image to the image display device 4000.

The image provision control unit 3100 determines the visual field from the display device 2400 based on the position of the image display device 4000 (more specifically, the display device 2400 of the image display device 4000) determined by a relative positional relation from the position information as a reference point of the ship obtained in the GPS compass 2000, the direction of the ship obtained in the gyro compass 7000, the size of the display device 2400, and so on. Then, based on the determined visual field, the depth below sea level, and the electronic marine chart, the image provision control unit 3100 may extract seafloor topography image data at the position information and the depth in the determined visual field from the electronic marine chart such as the three-dimensional overhead view maps illustrating bathymetric charts, to thereby create a virtual space image of a seafloor shape below sea level at the depth in the visual field. Note that the image provision control unit 3100 may create a virtual space image of a seafloor shape below sea level at the depth in the visual field, or may create a virtual space image of a seafloor shape below sea level at the depth at the position of the ship, perform the coordinate conversion, and then extract an image in the visual field from the image on which the coordinate conversion is performed.

Further, the image provision control unit 3100 obtains a draft of the ship according to the cargo and/or the number of passengers of the ship. For example, the draft information stored in the information storage device 5000 is compensated with the weight of cargo, and so on to obtain the draft of the ship. Then, the image provision control unit 3100 may calculate the difference between the depth below sea level and the draft, that is, the distance from the lowest part of the ship to the seafloor shape based on the draft, the position information, the depth below sea level, and the electronic marine chart, create a virtual space image of a seafloor shape below sea level in which a seafloor shape below sea level at the depth at the position of the ship where a distance from a lowest part of the ship to the seafloor shape is within a predetermined distance is emphasized and displayed, and provide the virtual space image to the image display device. Such a structure can easily notify a shipman or the like of a seafloor shape having a hazard of collision.

Figure 33:
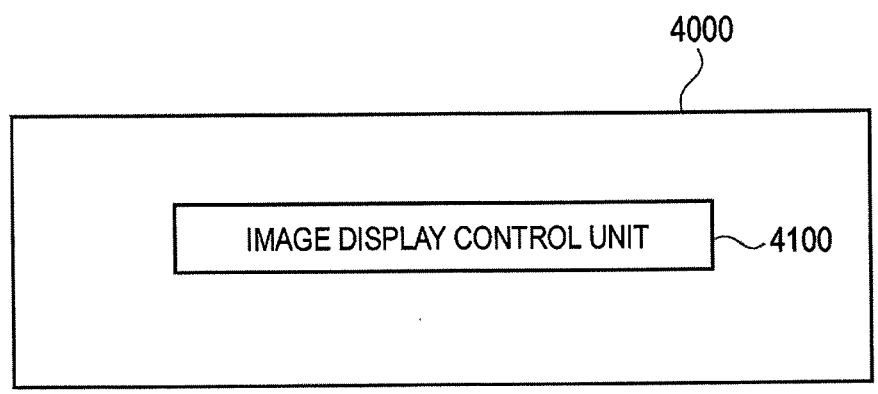
FIG. 33 is a diagram illustrating an example of a software structure of the image display device.

FIG. 33 is a diagram illustrating an example of a software structure of the image display device 4000.

Figure 34:
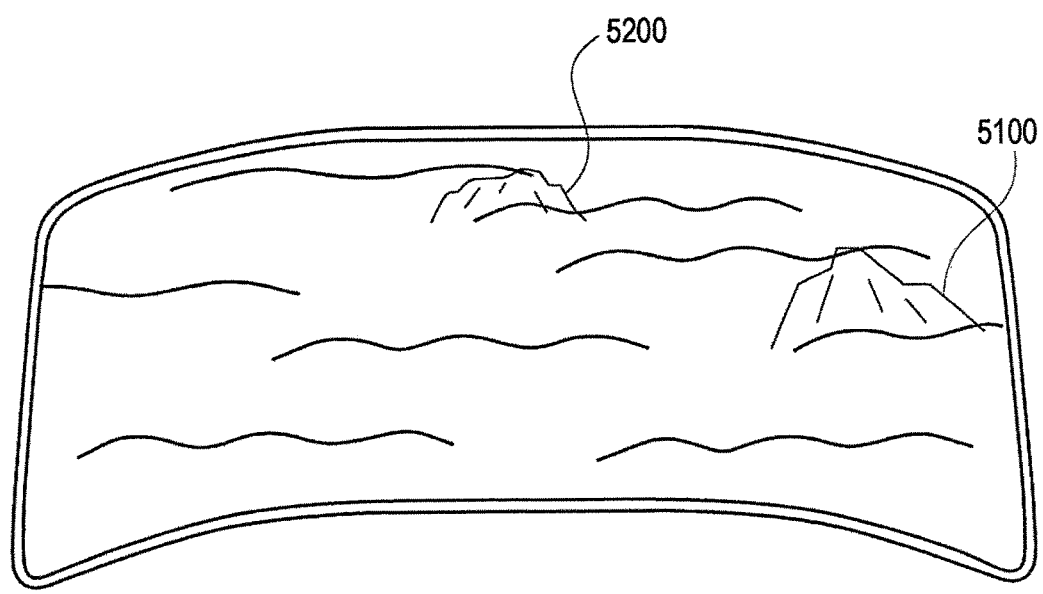
FIG. 34 is a diagram illustrating an example of displaying a virtual space image of a seafloor shape in an overlaid manner below sea level on a view from a display device.

As illustrated in FIG. 33, the image display device 4000 includes an image display control unit 4100 as a software structure (functional structure). The image display control unit 4100 displays the virtual space image of the seafloor shape provided by the image providing device 1000 in an overlaid manner below sea level on a view from the display device 2400. FIG. 34 is a diagram illustrating an example of displaying the virtual space image of the seafloor shape in an overlaid manner below sea level on the view from the display device 2400. For example, in FIGS. 34, 5100 and 5200 are displayed as rocks on the seafloor on a windshield at the stem in a manner overlaid on a view from the windshield. In the case of the structure to perform emphasizing display as described above, when the rock 5100 on the seafloor exists within a predetermined distance from the lowest part of the ship, the rock 5100 on the seafloor is emphasized as compared to the rock 5200 on the seafloor. Note that as an example of the emphasizing display, a character string such as "collision hazard!" may be displayed near the rock 5200, or the rock 5200 may be outlined with red.

As described above, according to this embodiment, information which is beneficial while the ship is cruising can be provided in a manner that a shipman or the like can intuitively comprehend the situation.

Embodiment 8

Hereinafter, Embodiment 8 will be described. In Embodiment 8, mainly differences from Embodiment 7 will be described.

Figure 35:
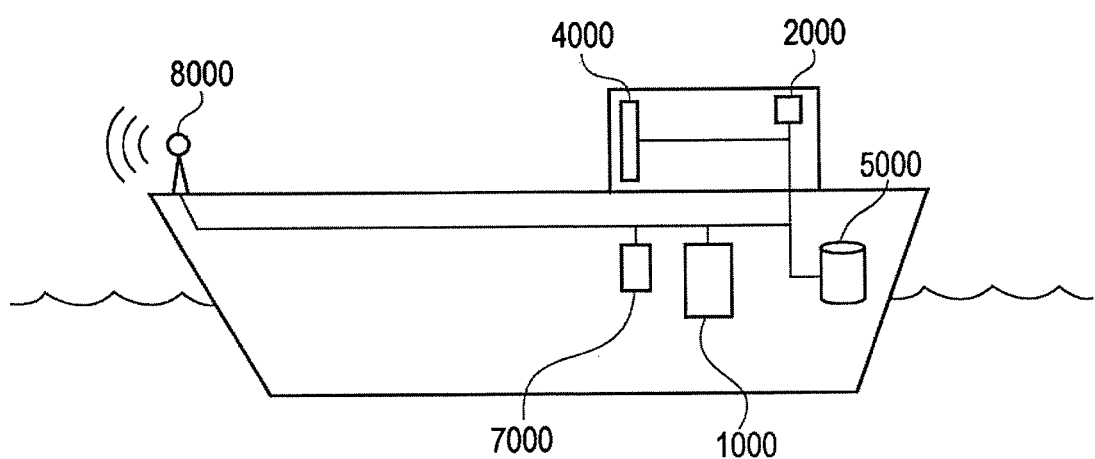
FIG. 35 is a diagram illustrating an example of a system structure of an image display system of an embodiment.

FIG. 35 is a diagram illustrating an example of a system structure of an image display system of Embodiment 8. As illustrated in FIG. 35, the image display system of Embodiment 8 newly includes a radar 8000 as an example of a radar device as compared to the image display system of Embodiment 7.

The image providing device 1000 of Embodiment 8 compares an image below sea level based on echoes of the radar 8000 with the electronic marine chart, and creates, when any obstacle not indicated on the electronic marine chart is detected below sea level, a virtual space image of the seafloor shape including the obstacle and provides this image to the image display device 4000.

With the structure of Embodiment 8, an obstacle such as sunken ship, caisson, or the like which is not indicated on the electronic marine chart can be detected, and the obstacle can be displayed in an overlaid manner below sea level on a view from the display device 2400.

Note that the radar 8000 of FIG. 35 may be a fish finder. With such a structure, a virtual space image of a seafloor shape including a marine life, such as a whale which can be an obstacle to a cruising ship, can be created and displayed in an overlaid manner below sea level on a view from the display device 2400.

Embodiment 9

Hereinafter, Embodiment 9 of the present invention will be described. In Embodiment 9, mainly differences from the above-described embodiment will be described.

Figure 36:
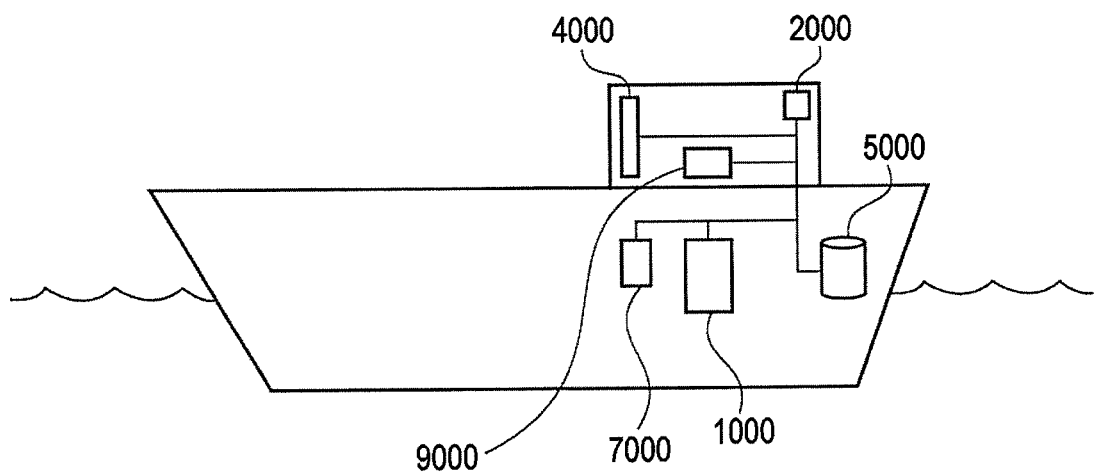
FIG. 36 is a diagram illustrating an example of a system structure of an image display system of Embodiment 9.

FIG. 36 is a diagram illustrating an example of a system structure of an image display system of Embodiment 9. As illustrated in FIG. 36, in the image display system of Embodiment 9, a gyro sensor 9000 detecting a posture of the ship is newly included in the image display system as an example of a detecting device as compared to the image display system of Embodiment 7.

The image providing device 1000 of Embodiment 9 performs coordinate conversion so that the sea level of a created virtual space image of a seafloor shape and the sea level of a view from the image display device become horizontal based on the posture of the ship detected by the gyro sensor 9000, and provides the converted image to the image display device 4000.

With the structure of Embodiment 9, when the ship is in a swinging state, the actual sea level and the sea level of the virtual space image of the seafloor shape are matched and displayed on a windshield.

Embodiment 10

Hereinafter, Embodiment 10 will be described. In Embodiment 10, mainly differences from the above-described embodiments will be described.

Figure 37:
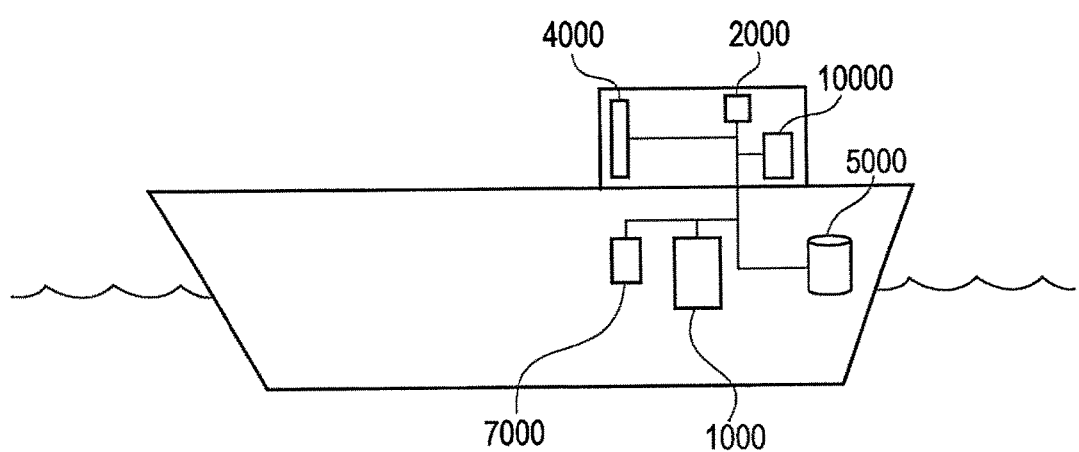
FIG. 37 is a diagram illustrating an example of a system structure of an image display system of Embodiment 10.

FIG. 37 is a diagram illustrating an example of a system structure of an image display system of Embodiment 10. As illustrated in FIG. 37, in the image display system of Embodiment 10, a receiving device 10000 receiving information is newly included in the image display system as compared to the image display system of Embodiment 7.

The receiving device 10000 receives information related to other ships in the sea area where the ship is present from a marine traffic center or the like for example.

The image providing device 1000 of Embodiment 10 creates a virtual space image including information related to other ships received in the receiving device 10000, and provides the virtual space image to the image display device 4000.

The image display device 4000 displays the virtual space image of the seafloor shape and the virtual space image including the information related to other ships which are provided by the image providing device 1000 in a manner overlaid on a view from the display device 2400.

The structure of Embodiment 10 allows a shipment or the like to intuitively recognize information related to other ships such as sizes and movements of other ships even in a dense fog or the like.

Embodiment 11

Hereinafter, Embodiment 11 will be described. In Embodiment 11, mainly differences from the above-described embodiments will be described.

Figure 38:
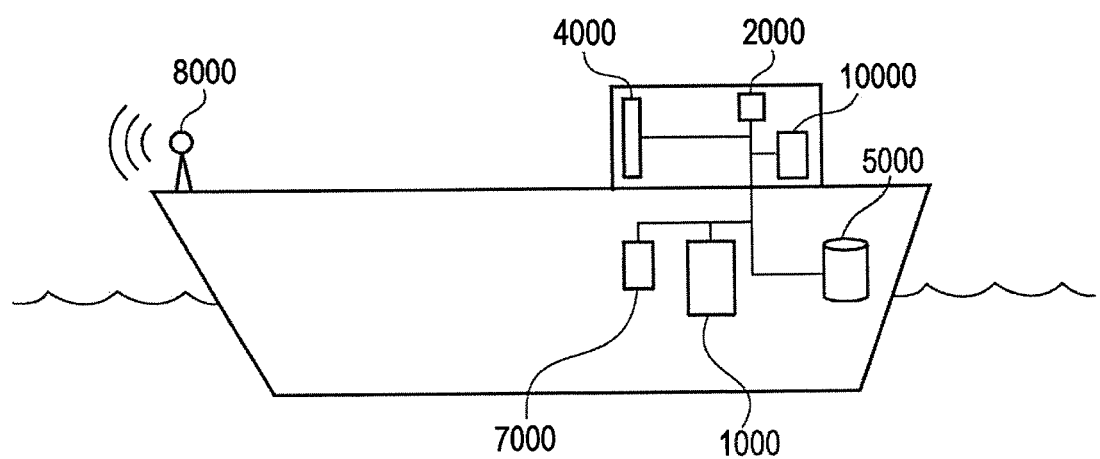
FIG. 38 is a diagram illustrating a system structure of an image display system of Embodiment 11.

FIG. 38 is a diagram illustrating an example of a system structure of an image display system of Embodiment 11. As illustrated in FIG. 38, in the image display system of Embodiment 11, as compared to the image display system of Embodiment 7, a radar 8000 and a receiving device 10000 receiving information are newly included in the image display system.

The receiving device 10000 of Embodiment 11 receives from another ship an echo of a radar of the other ship obtained by the other ship and position information where this ship detected the echo.

Then, the image providing device 1000 of Embodiment 11 compares an image based on an echo of the radar 8000 with an image based on the echo of the radar of the other ship received in the receiving device 10000 so as to create a virtual space image including an obstacle detected by the echo of the radar 8000 and an obstacle which is not detected by the echo of the radar 8000, and provides the created virtual space image to the image display device 4000. At this time, since the echo image of the radar of the other ship is generated based on the position where this ship detected the echo, this image is aligned with the image detected by the radar 8000 of the own ship using the received position information and then compared.

The image display device 4000 displays the virtual space image of the seafloor shape provided by the image providing device 1000 and the virtual space image including the obstacle detected by the echo of the radar 8000 and the obstacle which is not detected by the echo of the radar 8000 in a manner overlaid on a view from the display device 2400.

With the structure of Embodiment 11, by receiving an echo of a radar captured by another ship and overlaying this echo with the echo of the radar of the own ship to take the difference therebetween, an obstacle (a ship, a reef, a marine life such as a whale, or the like) which is not captured in the own ship can be identified, and a virtual space image including the obstacle can be created and displayed.

According to the above-described embodiments, information which is beneficial while the ship is cruising can be provided in a manner that a shipman or the like can intuitively comprehend the situation.

In the foregoing, the preferred embodiments of the present invention have been described in detail. However, the invention is not limited to such embodiments and can be modified or changed in various ways within the scope of the spirit of the present invention which is described in the claims.

For example, in the above-described embodiments, what is called a transmissive display of non-human body wearable type, such as a window or the like on which a transmissive liquid crystal film is attached, is described as an example, but a human body wearable type transmissive display such as a Head Mounted Display may be employed. Further, the image display device 4000 may be a mobile transmissive or non-transmissive display which is held by a shipman or the like. In the case of the non-transmissive display, the non-transmissive display displays an image imaged by an imaging device and a virtual space image in an overlaid manner.

Further, in the above-described embodiments, the image display device 4000 is described as an example, but a projector projecting a virtual space image to a window or the like on which a low-reflecting film is attached may be employed for example.

Note that the above-described embodiments may be combined arbitrarily and implemented.

INDUSTRIAL APPLICABILITY

The present invention is used for a technology called augmented reality.

The invention claimed is:

1. An image display system, comprising:
   a position information obtaining device obtaining position information of a ship,
   an information storage device storing an electronic marine chart including seafloor shapes and a tide table,
   an image display device,
   an image providing device providing an image to the image display device, and
   a direction obtaining device obtaining the direction of the ship,
   wherein the image providing device is configured to:
      obtain a draft of the ship according to at least information related to cargo or a number of passengers of the ship stored in the information storage device and a depth below sea level at a position of the ship based on the position information of the ship obtained in the position information obtaining device, the tide table, and information related to depths indicated on the electronic marine chart,
      determine, based on the draft, whether a distance from a lowest part of a current position of the ship to the seafloor shape is within a predetermined distance range to avoid a collision,
      determine a visual field from the image display device based on position information of the image display device determined based on the position information of the ship obtained in the position information obtaining device, the direction obtained in the direction obtaining device, and a size of the image display device,
      create a virtual space image of a seafloor shape below sea level at the depth within the visual field based on the draft, the position information, the determined visual field, the depth below sea level, and seafloor topography image data indicated on the electronic marine chart, the virtual space image indicating a relationship between the distance and the predetermined distance range to avoid a collision, and
      provide the virtual space image to the image display device, and
   wherein the image display device is configured to display the virtual space image of the seafloor shape by combining with a view from the image display device.

2. The image display system according to claim 1, further comprising a radar device,
   wherein the image providing device compares an image below sea level based on an echo of the radar device with seafloor topography image data indicated on the electronic marine chart, creates, when any obstacle not indicated on the electronic marine chart is detected below sea level, a virtual space image of the seafloor shape below sea level including the obstacle, and provides the virtual space image to the image display device.

3. The image display system according to claim 1, further comprising a detecting device detecting a posture of the ship,
   wherein the image providing device performs coordinate conversion so that a sea level of the created virtual space image of the seafloor shape becomes horizontal with a sea level of the view from the image display device based on the posture of the ship detected in the detecting device, and provides the converted image to the image display device.

4. The image display system according to claim 1, further comprising a receiving device receiving information,
   wherein the receiving device receives information of other ships in a sea area where the ship is present from a marine traffic center,
   wherein the image providing device creates a virtual space image including the information of other ships received in the receiving device and provides the virtual space image to the image display device, and
   wherein the image display device displays the virtual space image of the seafloor shape provided by the image providing device and the virtual space image including the information of other ships in a manner overlaid on a view from the image display device.

5. The image display system according to claim 1, further comprising:
   a radar device; and
   a receiving device receiving information,
   wherein the receiving device receives from another ship an echo of a radar device of the other ship which is obtained by the other ship,
   wherein the image providing device compares an image based on the echo of the radar device with an image based on the echo of the radar device of the other ship received by the receiving device to thereby create a virtual space image including an obstacle which is detected with the echo of the radar device and an obstacle which is not detected with the echo of the radar device and provides the created virtual space image to the image display device, and
   wherein the image display device displays the virtual space image of the seafloor shape provided by the image providing device and the virtual space image including the obstacle which is detected with the echo of the radar device and the obstacle which is not detected with the echo of the radar device, in a manner overlaid on a view from the image display device.

6. An image display method in an image display system, comprising: a position information obtaining device obtaining position information of a ship,
   an information storage device storing an electronic marine chart including seafloor shapes and a tide table,
   an image display device,
   an image providing device providing an image to the image display device, and
   a direction obtaining device obtaining the direction of the ship,
   the image display method comprising:
      obtaining a draft of the ship according to at least information related to cargo or a number of passengers of the ship stored in the information storage device and a depth below sea level at a position of the ship based on the position information of the ship obtained in the position information obtaining device, the tide table, and information related to depths indicated on the electronic marine chart, determining, based on the draft, whether a distance from a lowest part of a current position of the ship to the seafloor shape is within a predetermined distance range to avoid a collision, determining a visual field from the image display device based on position information of the image display device determined based on the position information of the ship obtained in the position information obtaining device, the direction obtained in the direction obtaining device, and a size of the image display device, creating a virtual space image of a seafloor shape below sea level at the depth within the visual field based on the draft, the position information, the determined visual field, the depth below sea level, and seafloor topography image data indicated on the electronic marine chart, the virtual space image indicating a relationship between the distance and the predetermined distance range to avoid a collision, and providing the virtual space image to the image display device by the image providing device; and displaying the virtual space image of the seafloor shape by combining with a view from the image display device by the image display device.

7. A non-transitory computer-readable medium storing thereon a program causing a computer of an image display system which comprises a position information obtaining device obtaining position information of a ship, an information storage device storing an electronic marine chart including seafloor shapes and a tide table, an image display device, and the computer providing an image to the image display device, and a direction obtaining device obtaining the direction of the ship to execute:

obtaining a draft of the ship according to at least information related to cargo or a number of passengers of the ship stored in the information storage device and a depth below sea level at a position of the ship based on the position information of the ship obtained in the position information obtaining device, the tide table, and information related to depths indicated on the electronic marine chart;

determining, based on the draft, whether a distance from a lowest part of a current position of the ship to the seafloor shape is within a predetermined distance range to avoid a collision;

determining a visual field from the image display device based on position information of the image display device determined based on the position information of the ship obtained in the position information obtaining device, the direction obtained in the direction obtaining device, and a size of the image display device; and creating a virtual space image of a seafloor shape below sea level at the depth within the visual field based on the draft, the position information, the visual field, the depth below sea level, and seafloor topography image data indicated on the electronic arine chart, the virtual space image indicating a relationship between the distance and the predetermined distance range to avoid a collision, and providing the virtual space image to the image display device which displays the virtual space image by combining with a view from the image display device.

8. The image display system according to claim 1, further comprising a transmissive display system attached to a windshield of the ship to display the virtual space image of the seafloor shape by combining with the view from the image display device and a view from the windshield.

* * * * *